(12) United States Patent
Le Crom et al.

(10) Patent No.: US 7,984,478 B2
(45) Date of Patent: Jul. 19, 2011

(54) METHOD AND APPARATUS FOR A RECEIVER/DECODER

(75) Inventors: Francois Le Crom, Paris (FR); Patrice Letourneur, Paris (FR); Michel Maillard, Paris (FR)

(73) Assignee: Canal + Technologies Societe Anonyme, Paris (FR)

( * ) Notice: Subject to any disclaimer, the term of this patent is extended or adjusted under 35 U.S.C. 154(b) by 1804 days.

(21) Appl. No.: 10/487,276

(22) PCT Filed: Aug. 21, 2002

(86) PCT No.: PCT/IB02/03782
§ 371 (c)(1), (2), (4) Date: Feb. 28, 2005

(87) PCT Pub. No.: WO03/019931
PCT Pub. Date: Mar. 6, 2003

(65) Prior Publication Data
US 2005/0144646 A1    Jun. 30, 2005

(30) Foreign Application Priority Data

Aug. 21, 2001  (EP) .................................... 01402202
May 31, 2002  (EP) .................................... 02253866

(51) Int. Cl.
*H04N 7/16* (2006.01)
(52) U.S. Cl. .................... 725/151; 725/152; 725/139
(58) Field of Classification Search .................. None
See application file for complete search history.

(56) References Cited

U.S. PATENT DOCUMENTS

| | | | | |
|---|---|---|---|---|
| 5,724,091 A | * | 3/1998 | Freeman et al. | 725/138 |
| 6,144,412 A | * | 11/2000 | Hirano et al. | 348/441 |
| 2002/0067376 A1 | * | 6/2002 | Martin et al. | 345/810 |
| 2002/0144010 A1 | * | 10/2002 | Younis et al. | 709/314 |
| 2002/0145621 A1 | * | 10/2002 | Nguyen | 345/718 |
| 2007/0214482 A1 | * | 9/2007 | Nguyen | 725/91 |

FOREIGN PATENT DOCUMENTS

| | | |
|---|---|---|
| CN | 1295756 A | 5/2001 |
| EP | 0935382 A1 | 8/1999 |
| JP | 2000-174722 A | 6/2000 |
| KP | 2001-0022200 | 3/2001 |
| KP | 2001-0031004 | 4/2001 |

(Continued)

OTHER PUBLICATIONS

Japanese Office Action for Application No. 2003-524252, mailed on Jul. 29, 2008 (7 pages).

(Continued)

*Primary Examiner* — Brian T Pendleton
*Assistant Examiner* — Olugbenga Idowu
(74) *Attorney, Agent, or Firm* — Osha • Liang LLP

(57) ABSTRACT

A method and apparatus relating to a receiver/decoder in a digital television environment, including logical devices (including logical demultiplexer devices) for representing physical and other devices in the receiver/decoder. The method includes the instantiation of devices by the receiver/decoder as required to support functionality thereof. The method further includes the use of multiple demultiplexers/remultiplexers, for example in the recording of more than one service simultaneously; and a control word device for the management of control word operations; the use of two or more tuners. Various elements of a digital television system (such as a receiver/decoder and a set top box) are also disclosed.

4 Claims, 17 Drawing Sheets

FOREIGN PATENT DOCUMENTS

WO          9940719 A1     8/1999

OTHER PUBLICATIONS

Japanese Office Action for Application No. 2003-524252, mailed on May 22, 2007 (6 pages).
Chinese Office Action for Application No. 02820654.1, mailed on Oct. 14, 2005 (10 pages).
Chinese Office Action for Application No. 02820654.1, mailed on Jun. 13, 2008 (10 pages).
Chinese Office Action for Application No. 02820654.1, mailed on Nov. 7, 2008 (10 pages).
Korean Office Action for Application No. 2004-7002527, mailed on Feb. 27, 2009 (9 pages).
Korean Office Action for Application No. 2004-7002527, mailed on Nov. 30, 2009 (5 pages).
Patent Abstracts of Japan for Japanese Publication No. 2000-174722, publication date Jun. 23, 2000 (1 page).
Shigeru Yoshida, "Digital Broadcast Receiver", information processing, corporate juridical person—information processing academic society, Nov. 15, 2000, vol. 41, No. 11, pp. 1251-1255.
Olu Akiwumi-Assani et al., "Multi-media Terminal Architecture", Philips J. Res. vol. 50, No. 1/2, 1996, pp. 169-184.
"Functional Model of a Conditional Access System", EBU Review Technical, European Broadcasting Union. Brussels, BE, No. 266, Dec. 21, 1995, pp. 64-77.
International Search Report issued in PCT/IB02/03782, mailed on Apr. 7, 2003 (2 pages).

* cited by examiner

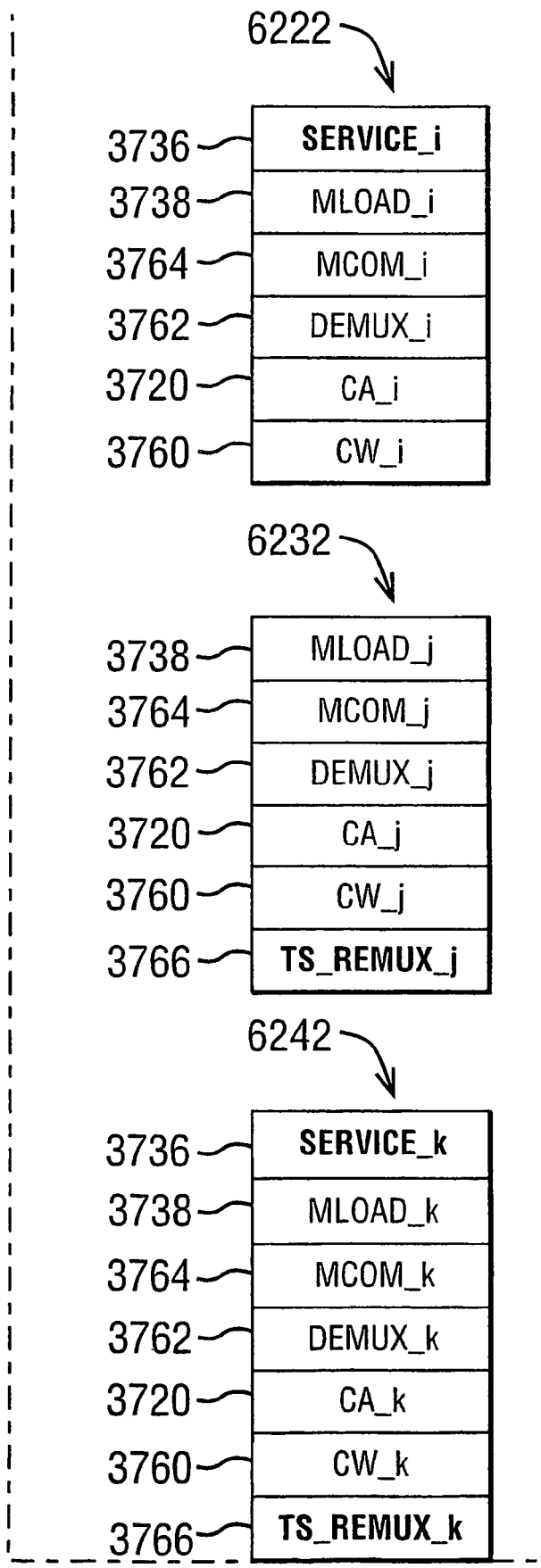
FIG. 11(contd.)

FIG. 12
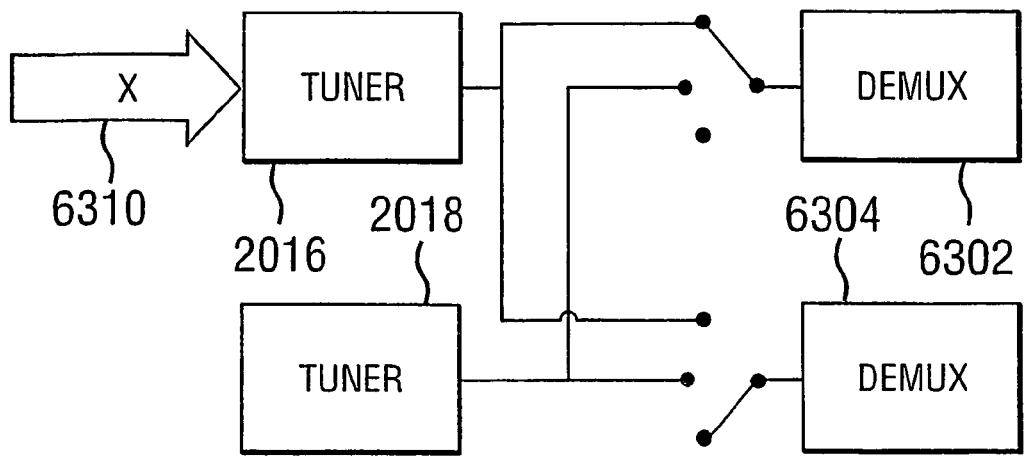
a
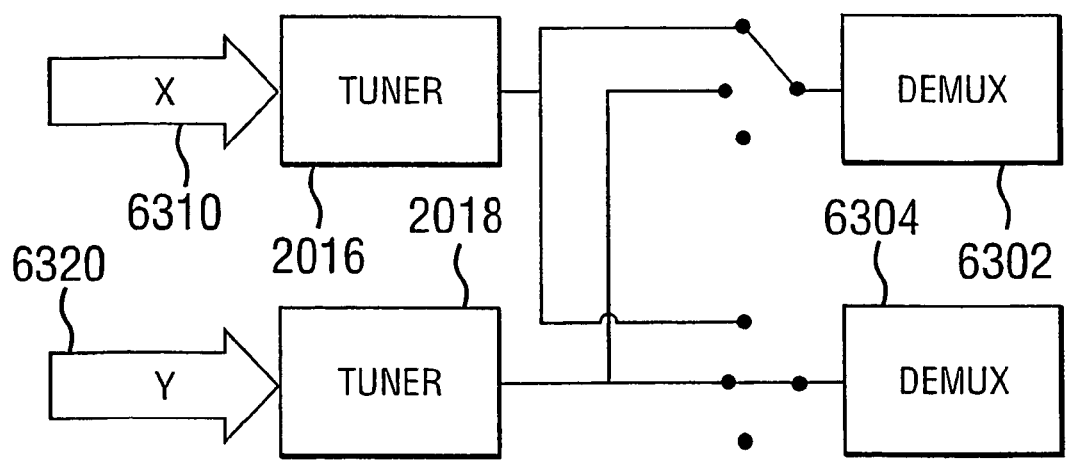
b
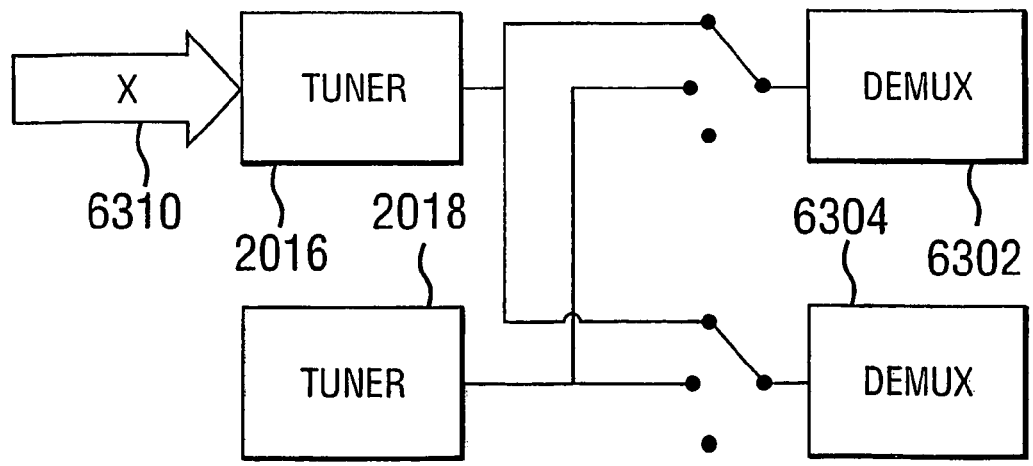
c

METHOD AND APPARATUS FOR A RECEIVER/DECODER

The invention relates to methods and apparatus for use in or with a receiver/decoder, and may include a receiver/decoder, a broadcast system, a computer program product, a computer readable medium having stored thereon a computer program product and/or a signal tangibly embodying a computer program product. The invention finds particular application in supporting one or more functions of the receiver/decoder.

Embodiments of the invention may support for instance communication and/or control between software applications and supporting devices in a receiver/decoder, and/or performance of a security process in accessing one or more data streams at the receiver/decoder.

Digital television systems transmit television channels to the viewer in digital, rather than analogue, form. The digital channels are encoded into a digital data stream at the transmitter end, and are decoded at the receiver end using a digital receiver/decoder. To allow interactivity, an uplink may be provided, either via the same medium that delivers the television channels, or else via a different medium such as a telephone link. Further types of data, such as digital audio, software and interactive data can be or are also broadcast. As used herein, the term "digital television system" includes for example any satellite, terrestrial, cable and other system.

The term "receiver/decoder" as used herein may connote a receiver for receiving either encoded or non-encoded signals, for example television and/or radio signals, preferably in MPEG format, which may be broadcast or transmitted by some other means. The term may also connote a decoder for decoding received signals. Embodiments of such receiver/decoders may include a decoder integral with the receiver for decoding the received signals, for example, in a "set-top box", such as a decoder functioning in combination with a physically separate receiver, or such a decoder including additional functions, such as a web browser, a video recorder, or a television.

The term MPEG refers to the data transmission standards developed by the International Standards Organisation working group "Motion Pictures Expert Group" and in particular but not exclusively the MPEG-2 standard developed for digital television applications and set out in the documents ISO 13818-1, ISO 13818-2, ISO 13818-3 and ISO 13818-4. In the context of the present patent application, the term includes all variants, modifications or developments of MPEG formats applicable to the field of digital data transmission.

Signals received by a receiver/decoder may be dealt with in different ways. For instance, they may be played as they are received, or recorded for later playback. Incoming signals to a receiver/decoder may also be scrambled, particularly in the case of broadcast digital television systems since users may have to pay for receiving selected channels or programmes and scrambling can be used as a way of preventing unauthorised access. The receiver/decoder may also therefore provide a descrambling function and equipment of a relevant type is sometimes called an Integrated Receiver/Descrambler (IRD).

Known digital receivers/decoders are effectively based on a computer type architecture, having an associated hardware/software platform, an operating system and software applications. For instance, in a known form of receiver/decoder, there are provided:

software applications for user interaction and for controlling functionality of the receiver/decoder
    hardware and software devices for carrying out functions in use of the receiver/decoder, such as receiving, decoding and descrambling incoming signals and running the machine itself in terms of providing an LED display, clock and so forth
    middleware such as interpreters for enabling applications to be developed separately from, but to interact with, the devices.

These three aspects are generally supported by an operating system of the equipment in which they are installed.

In computing technology, an Application Programming Interface (API) usually comprises or includes the set of function calls and services that a program makes available to other processes. Each function or service has a set format which specifies values which must be supplied, and which will be returned, in use of the function or service and the API sets these out. The addition of the middleware layer mentioned above in a receiver/decoder, together with an API, means that applications become portable. That is, they can be reused on different receiver/decoders, having different software/hardware platforms, which is clearly beneficial, as long as the applications and middleware conform to the same API. It also means that users can download applications from different sources onto an existing receiver/decoder platform.

One further feature which has been developed in a known receiver/decoder is a device layer interface (DLI), sometimes referred to simply as a Device Layer. This is a further step in flexibility. The devices in the receiver/decoder have to interact with software so that they can for instance be started and stopped and can notify events and they are provided, in known manner, with device drivers for that purpose. Hardware devices are provided with separate device drivers and devices which are embodied in software, or firmware, may have integrated drivers. A device driver is a program to control a particular device and it responds to communications such as interrupts from the system to convert instructions from the operating system or an application to messages for a specific device. In this known arrangement, the DLI provides an interface between the middleware and device drivers. Once this is done, the middleware can be ported to any receiver/decoder whose devices comply with the DLI.

A receiver/decoder of this general type is described in international patent application number WO 99/40719, in the name of the present applicant. In the system described there, each function of the receiver/decoder is related to a device in the DLI. The DLI holds software representations of devices and provides a device manager which looks after interactions with the devices in use of the receiver/decoder. When devices are required to carry out a function, data passes between programs such as application instruction sequences and the devices. The device manager controls this routing by declaring each program as a "client" when it needs access to a device and assigns the program a client number which it adds to a client list for the duration of access by that program to the relevant device.

The present invention seeks to provide one or more improvements in relation to the above prior art.

In a first aspect of the invention, there is provided a logical device for a receiver/decoder.

Such a logical device, situated for example in the device layer interface of a receiver/decoder, may reduce the dependence of the software of the receiver/decoder upon the specific hardware solution of the receiver/decoder, potentially resulting in the increased portability of the software. It may, in addition, facilitate the easy upgrade of a receiver/decoder without changes to the software being required.

Preferably, the logical device further comprises means for binding the logical device to a further device. That is to say that the logical device may preferably be adaptable to rely upon a particular hardware device to perform functionality offered by it. This may advantageously increase the stability of the software of a receiver/decoder.

The binding means is preferably adapted to bind the logical device to a plurality of further devices. This may confer the advantage of increasing the flexibility of a receiver/decoder and facilitate the efficient use of hardware. The further layer of abstraction may in addition allow for easier programming and maintenance of software, and easier programming of applications to be executed on a receiver/decoder running the software.

The binding means may preferably be adapted to bind the logical device to a software device. This added layer of abstraction may allow for easier programming and maintenance of software.

In a preferred embodiment, the logical device is adapted to manage a demultiplexing operation. Such a logical device encapsulates a number of hardware operations, which may result in the provision of a platform for which applications to be run on a receiver/decoder may be programmed more easily.

The logical device may preferably comprise means for restricting functionality offered by the device. For example, a logical demultiplexer may be adapted to represent a demultiplexer supporting the playback of a bitstream, in which it is required to perform demultiplexing and filtering operations, and other operations may be prohibited; alternatively, the logical device may be adapted to represent a demultiplexer supporting the recording of a bitstream, in which case, it is required to perform filtering and remultiplexing operations, and other operations may be prohibited. This restriction of functionality may confer additional stability.

In a second aspect of the invention, there is provided apparatus for a receiver/decoder, the apparatus being provided with at least one function description describing a function supported by one or more processes in use of the receiver/decoder, and means for loading a value with respect to the or each function description for use in said one or more processes.

Each function description preferably comprises a set of one or more data fields which together characterise the described function in use of the receiver/decoder.

The availability of one or more of said processes is preferably determined by a value in at least one data field associated with that process. For example, the availability may preferably be determined by the presence or absence of said value in the at least one data field.

In a preferred embodiment, each process, and thus each function, is supported in use by one or more devices, and the apparatus is provided with at least one device description in respect of one or more of said devices; means for loading device-specific data with respect to said device description; means to detect the presence of at least one device in the receiver/decoder which supports a function described by the function description; and means to load a function identifier for that function description as part of a device identifier for use in communicating with the at least one device in use of the receiver/decoder.

Preferably, the function supported by one or more processes comprises a demultiplexing function. In this case, the means for loading a value is preferably adapted to load multiple values comprising a set of identifiers for input sources of multiplexed signals.

Preferably, the means to detect the presence of at least one device comprises means to detect the presence of each of a plurality of devices in the receiver/decoder which together support the function described by the function description and said means to load the function identifier for that function description as part of a device identifier is adapted to load the same function identifier as part of the device identifier in respect of each of said plurality of devices.

Preferably, the apparatus is adapted to modify a function description in accordance with devices detected.

In a preferred embodiment, the apparatus is provided with at least two different function descriptions and the means to load a function identifier is adapted to load a function identifier for each of at least two different function descriptions to provide at least two different device identifiers for use in communicating with a common device in use of the receiver/decoder.

Preferably, the apparatus comprises control signal management means for managing signals for controlling one demultiplexing device to demultiplex at least first and second data streams over a common time period.

Also preferably, the apparatus comprises control signal management means for managing signals for controlling one or more remultiplexing devices to remultiplex at least first and second data streams for recording over a common time period.

In an aspect of the invention, there is provided a method of operating a receiver/decoder, which method comprises creating and/or accessing at least one function description describing a function supported by one or more processes in use of the receiver/decoder, and loading a value with respect to the or each function description for use in said one or more processes. The loading step is preferably performed at first initialisation of the receiver/decoder.

In a further aspect, there is provided a method of operating a receiver/decoder which comprises communicating with at least one device in providing a function, wherein a device identifier is used in communicating with the at least one device, which identifier comprises a part associated with the function and a part associated with the device.

In a further aspect, there is provided apparatus comprising means for instantiating a device for a receiver/decoder. This may confer the advantage of reducing dependence upon a particular hardware configuration of a receiver/decoder, resulting in increased portability of software, and increased efficiency in terms of requirements upon programmers and size of program, improved reliability and maintenance of the product.

The instantiating means preferably comprises means for providing generic information and means for providing instance-specific information to a device being instantiated. This abstraction of functionality may confer the advantage of using resources more efficiently. When implemented in software, this may advantageously result in a smaller compiled size. The instantiating means may for example copy an existing instance of a device (including the generic information, which may in turn include an identifier identifying the device type) and then impart to it information specific to the instance being created (including, for example, an instance number). The device type identifier and the instance number then together form a unique identifier for the device.

Preferably, the instantiating means is adapted to instantiate a device statically. Using static instantiation, that is instantiation at the time of booting or rebooting, may provide a more stable environment than using dynamic instantiation.

In a preferred embodiment, the instantiated device is adapted to provide functionality to a client. This further level of abstraction may afford a greater ease of maintenance of the system and ease of programming and maintenance of code.

Preferably, the instantiated device is adapted to provide functionality to a plurality of clients. This feature may result in more efficient use of resources (for example of the hardware of a receiver/decoder).

Preferably, the instantiated device is capable of asynchronous communication, which may give rise to more fluid operation and more stable software.

In a particularly preferred embodiment, the apparatus comprises means for receiving information relating to a new type of device to be instantiated. This information may for example be downloaded by a receiver/decoder, and it may relate to a new version of an existing device, or to a new type of device. This feature may thus increase the flexibility and ease of maintenance of software.

In another particularly preferred embodiment the apparatus comprises means for determining a hardware environment. The apparatus may thus be able to tailor instantiated devices based upon detected physical device; it may not be necessary to know details of the environment upon which software is to be run at the time of compilation.

Preferably, the instantiated device is a logical device as aforesaid.

In a further aspect of the invention, there is provided apparatus for a receiver/decoder, the apparatus being provided with at least one device description and means for loading device-specific data with respect to said device description.

Preferably, the means for loading device-specific data is adapted to load at least one value with respect to one or more device descriptions, said value comprising at least part of a device identifier for use in communicating with a device in use of the receiver/decoder.

The apparatus may also comprise means for loading device-specific data with respect to more than one respective copy of at least one of the device descriptions. The device-specific data preferably includes a value loaded to each device instance as device-specific data including at least part of a device identifier which is different from any value loaded as at least part of a device identifier to another copy of the same device description.

Preferably, when instantiating devices for use in the provision of a function in a receiver/decoder, more than one different device is used to provide said function, each device description with at least one value loaded provides a device instance, and the at least part of a device identifier is common to at least one device instance for each of at least two different devices used to provide said function.

The device-specific data may, for example, comprise at least one value for a parameter of a procedure supported by a device to which the description relates. This value may for example comprise an identifier for an authorised input to the device to which the description relates.

In a particularly preferred embodiment, the device to which the description relates may comprise a demultiplexing device.

The apparatus may further comprise limiting means for limiting the number of copies of one or more device descriptions to a preset maximum. This may assist in preventing overloading of the resources of the apparatus.

Preferably, the apparatus is further provided with at least one function description describing a function supported by one or more processes in use of the receiver/decoder, and means for loading a value with respect to the or each function description for use in said one or more processes.

In a further aspect of the invention, there is provided a method of operating a receiver/decoder to provide a function, which method comprises selecting an identifier for a device from at least two different identifiers available for that device and using the selected identifier in relation to communications with the device to provide the function.

In yet a further aspect of the invention, there is provided a method of operating a receiver/decoder to provide a function, which method comprises communicating with at least two different devices used in providing the function, using a different respective identifier in relation to communication with each of said two different devices, wherein said different respective identifiers share a common portion.

In a further aspect of the invention, there is provided apparatus for processing data, comprising means for operating a demultiplexer to demultiplex a plurality of services simultaneously. This aspect may benefit from increased flexibility. The demultiplexer operating means may, for example, be adapted to effect the demultiplexing of at least three, five, ten or twenty services simultaneously.

In a particularly preferred embodiment, the demultiplexer operating means comprises means for allocating a respective logical demultiplexer as described above to each service to be demultiplexed.

In a further aspect of the invention, there is provided apparatus for controlling a demultiplexing process in a receiver/decoder, comprising control signal management means for managing signals for controlling one demultiplexing device to demultiplex at least first and second data streams over a common time period.

The control signal management means may be adapted to maintain a first family of devices for use together in controlling the demultiplexing device to demultiplex said first data stream, and to maintain a second family of devices for use together in controlling the demultiplexing device to demultiplex said second data stream.

Preferably, the devices of each family are each allocated an identifier which has at least a common portion for all the devices of a family, the common portion for the first family being different from said common portion for the second family, for use in coordinating processes performed by the devices of each family in controlling the demultiplexing device to demultiplex a respective data stream.

The apparatus may preferably further comprise at least one remultiplexing device for remultiplexing each of said at least two data streams for recording.

In a further aspect, the aforesaid apparatus is provided in a receiver/decoder, further comprising at least two inputs for connection to respective channels and correlation means for correlating a signal received at a first of said inputs with a signal received at a second of said inputs.

In yet a further aspect of the invention, there is provided a control word device for managing a descrambling operation, the device being implemented in software. It is known for the descrambling operation to be managed by hardware devices; the present aspect of the invention may confer the advantage of increased security.

In yet a further aspect, the invention provides apparatus for a receiver/decoder comprising an interface for use in controlling descrambling equipment to descramble signals.

The apparatus may further comprise means to assign an identifier to an instance of use of the descrambling equipment to descramble a signal, which identifier is used in controlling the descrambling equipment in relation to that instance of use by means of the interface.

The means to assign an identifier may comprise means to assign more than one identifier to the descrambling equipment over the same time period, each identifier being for use in controlling the descrambling equipment with respect to a respective instance of use of the descrambling equipment.

At least first and second instances of use of the descrambling equipment may be subject to at least one different respective access condition for descrambling signals.

The apparatus may be arranged to control supply of a decryption key to the descrambling equipment for use in a respective descrambling process. For example, the apparatus may be arranged to co-ordinate supply of a decryption key, from means for receiving delivery of decryption keys, to the descrambling equipment, the co-ordination being done by use of the identifier assigned to each respective instance of use of the descrambling equipment. The decryption key may, for example, be received in a multiplexed information signal.

The interface may be accessible to at least one device in a family of devices supporting a demultiplexing function and the apparatus may further comprise means to provide more than one instance of the same device in the family of devices, each instance so provided being related to at least one assigned identifier for an instance of use of the descrambling equipment.

In yet a further aspect of the invention, there is provided a method of descrambling scrambled signals, comprising the use of an interface in the control of descrambling equipment. The method may, for example, comprise the steps of assigning an identifier to an instance of use of the descrambling equipment; and using the identifier in controlling the descrambling equipment in relation to said instance of use by means of the interface.

The method may further comprise assigning a first identifier to a first instance of use of the descrambling equipment, assigning a second identifier to a second instance of use of the descrambling equipment, and using the first and second identifiers to distinguish the first and second instances of use in controlling the descrambling equipment, said first and second instances of use occurring over a common time period.

The first and second instances of use of the descrambling equipment may be subject to at least one different respective access condition for descrambling.

In a further aspect of the invention, there is provided apparatus for processing data, comprising means for recording a first service, means for simultaneously recording a second service and means for playing back the first service and the second service at respective times chosen by a user. Such apparatus may provide increased flexibility and utility for the user.

In yet a further aspect, the invention provides apparatus for a receiver/decoder comprising recording means for recording two or more programme data streams over a common time period.

In yet a further aspect, the invention provides a method of recording programme signals, comprising recording two or more different programme data streams over a common time period.

In a further aspect of the present invention, there is provided apparatus for processing data, comprising means for receiving service data on a first channel and means for receiving conditional access data relating to that service on a second channel. This may confer the advantage of reducing the bandwidth required to receive conditional access.

The apparatus may further comprise means for causing the conditional access data receiving means to change the channel from which it receives the conditional access data. It may thus be possible to receive conditional access data from a channel which changes, for, example periodically, enabling the channel upon which conditional access data is broadcast to change, thus allowing channel-hopping of conditional access data, which may increase security.

To this end, a further aspect of the invention provides a broadcast centre comprising service data broadcasting means adapted to broadcast service data excluding conditional access data on a first channel, and conditional access data broadcasting means for broadcasting conditional access data relating to the service on a second channel.

The broadcast centre may further comprise means for causing the conditional access data broadcasting means to change the channel upon which the conditional access data is broadcast.

In yet a further aspect of the invention, there is provided a conditional access system comprising service data broadcasting means for broadcasting service data excluding conditional access data on a first channel, conditional access data broadcasting means for broadcasting conditional access data relating to the service on a second channel, service data receiving means for receiving the service data and conditional access data receiving means for receiving the conditional access data.

In a further aspect, the invention provides apparatus for a receiver/decoder, for use in receiving and/or decoding signals received at the apparatus over more than one channel, wherein said apparatus comprises at least two inputs for connection to respective channels and correlation means for correlating a signal received at a first of said inputs with a signal received at a second of said inputs.

The apparatus may further comprise detection means for detecting a channel identifier received in the signal at the first input, channel selection means for selecting a channel for connection to said second input, and control means to control the channel selection means to select a channel identified by the channel identifier for connection to said second input. Each respective channel may for example have a different carrier frequency.

The signal received at the first input may comprise at least primarily content data and the signal received at the second input may comprise administrative data with respect to the content data.

The apparatus may further comprise an interface for use in controlling descrambling equipment to descramble information signals.

In a further aspect of the invention, there is provided a broadcast system for broadcasting related signals in multiplexed signal transport streams, which comprises broadcast means for broadcasting a first signal in a first multiplexed signal transport stream, broadcast means for broadcasting a second signal in a second multiplexed signal transport stream, and correlation signal transmission means for transmitting a correlation signal for use in correlating the related signals. The correlation signal may for example comprise carrier frequency data for identifying a carrier frequency for at least one of the first and second transport streams. The correlation signal may additionally or alternatively comprise at least one slot identifier for identifying a slot in one of the first and second transport streams.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which:—

Figure 13:
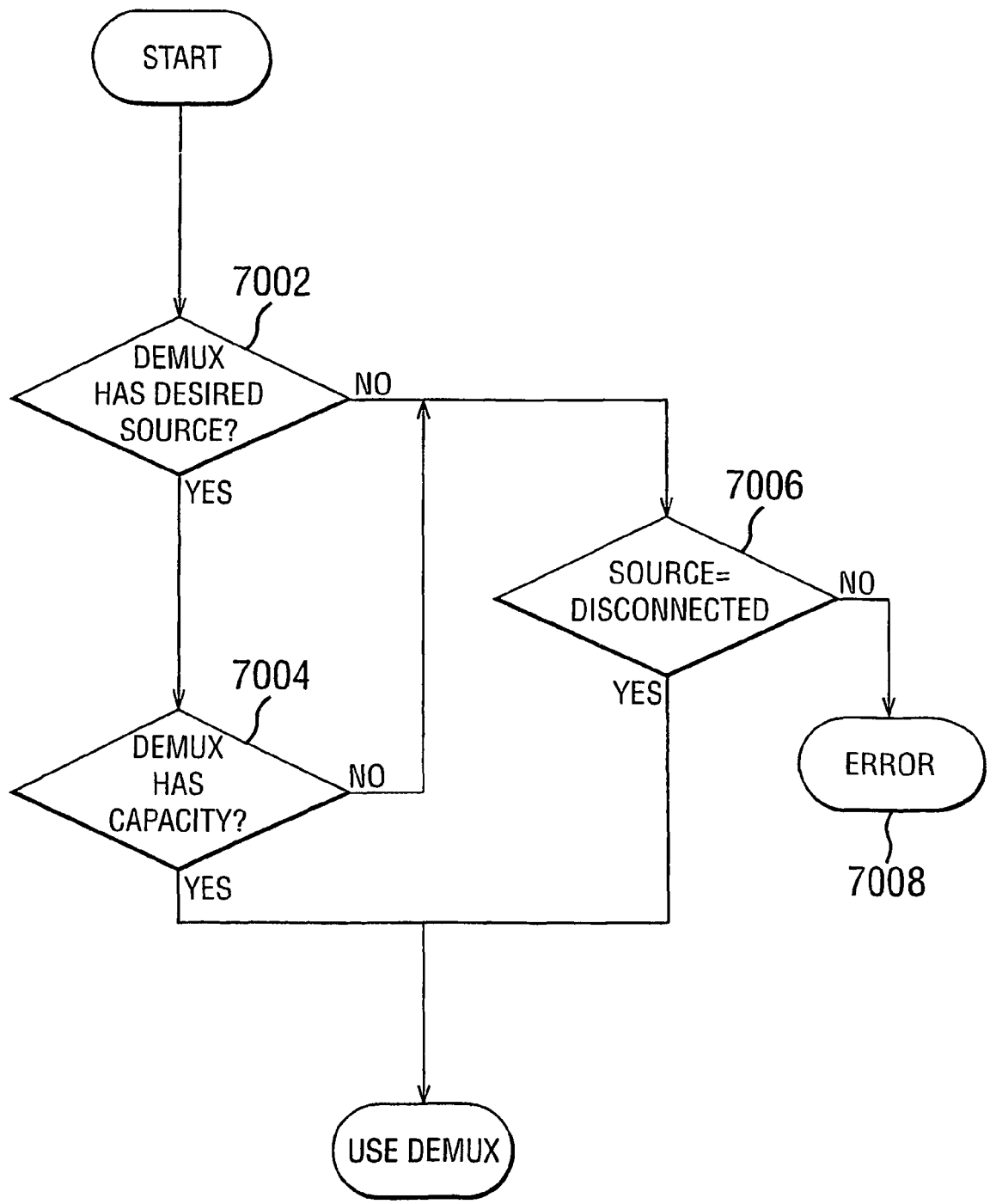
Figure 14:
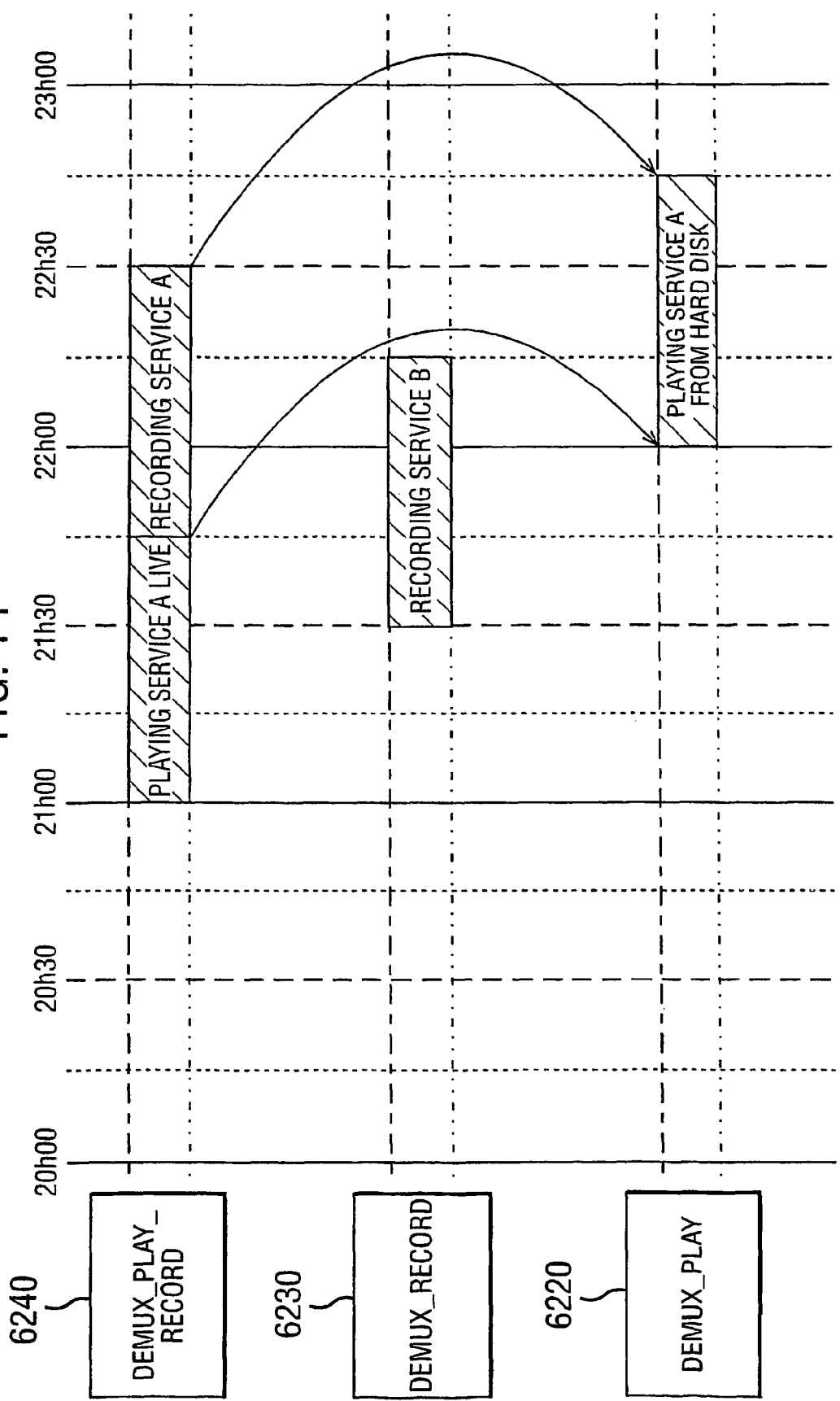
Figure 15:
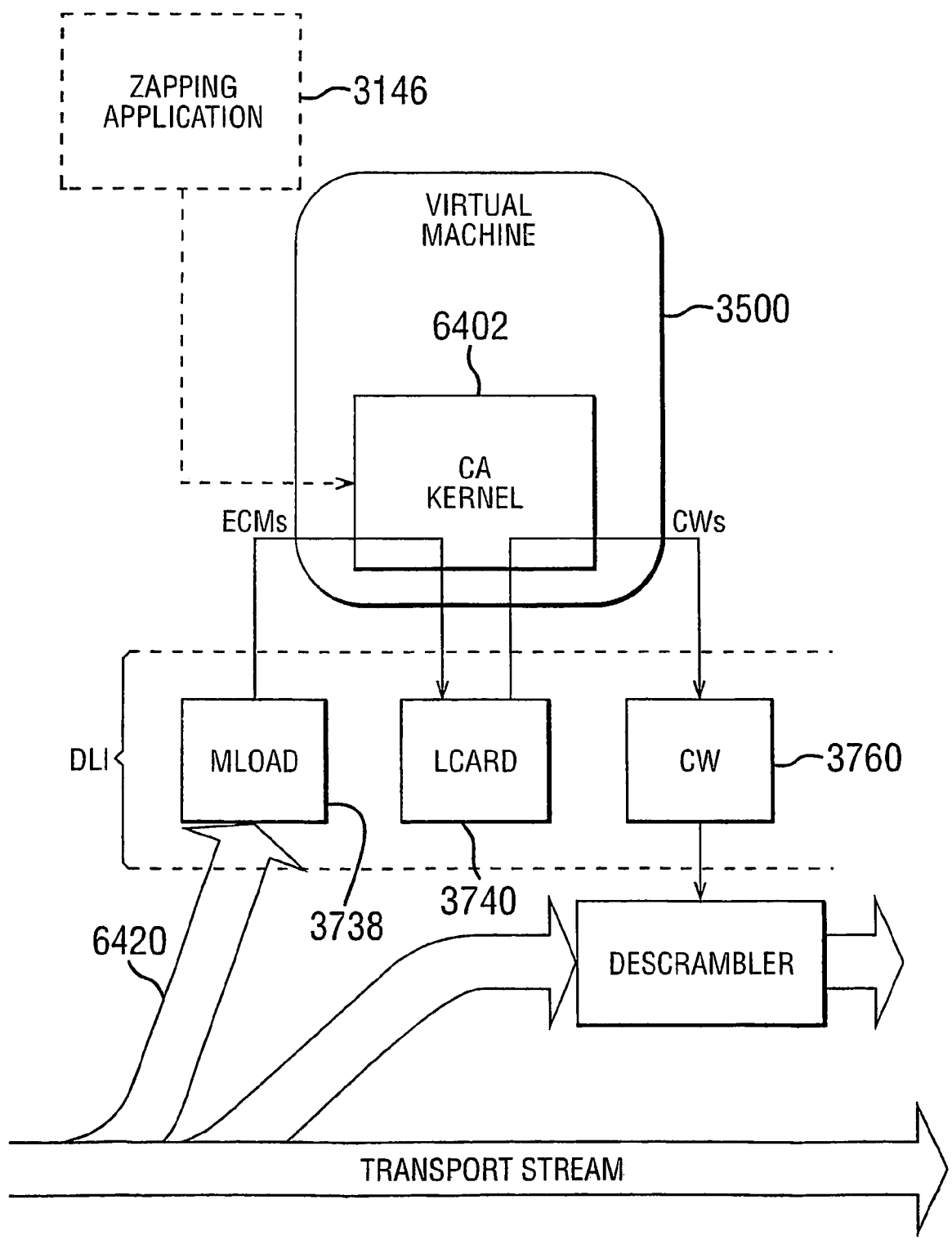
Figure 16:
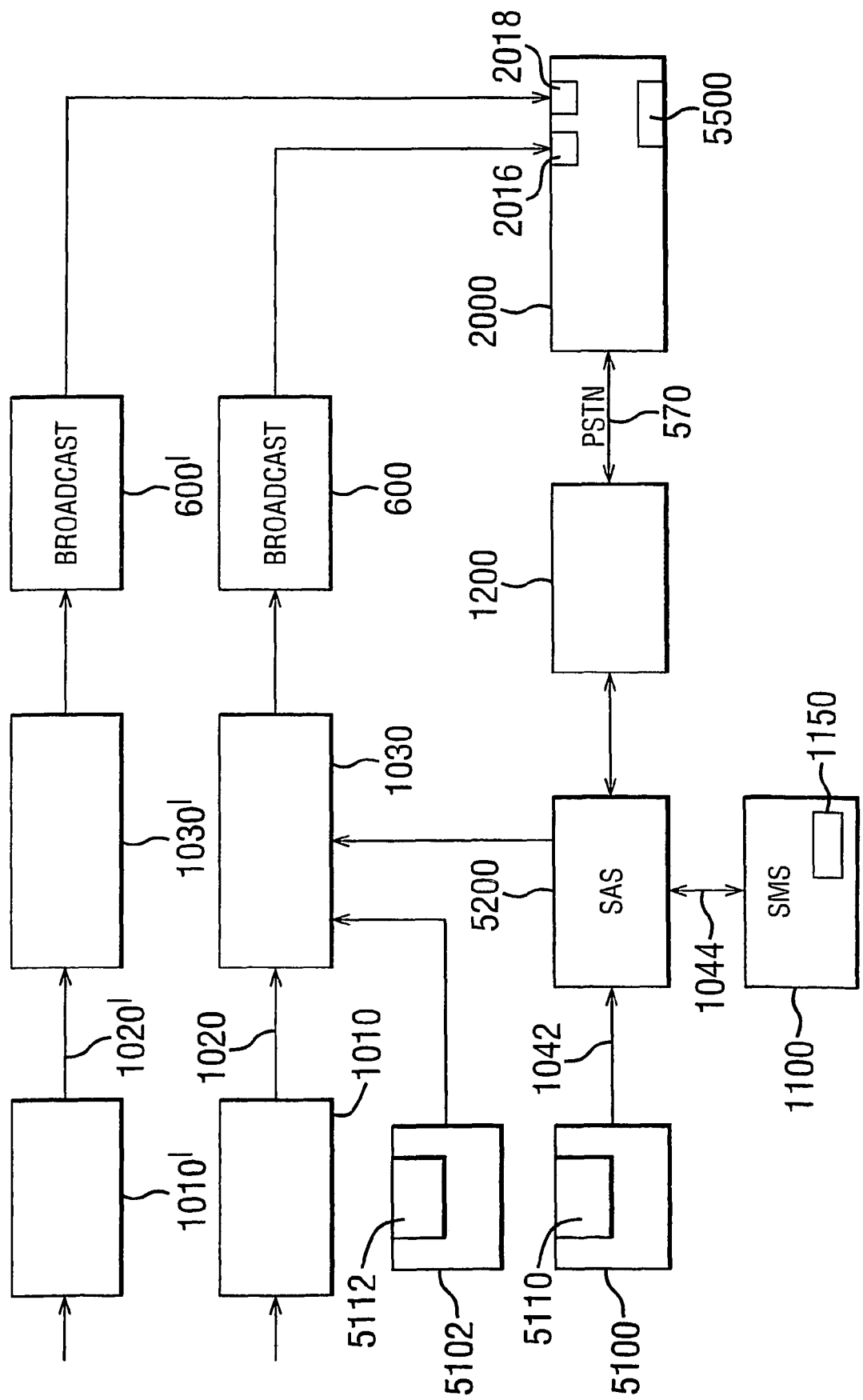

FIGS. 12a, b and c represent stages in a process for selecting a hardware demultiplexer;

FIG. 13 is a flow diagram for the process to which FIG. 12 relates;

FIG. 14 shows time lines illustrating the facility of an embodiment for recording more than one service simultaneously;

FIG. 15 illustrates the conditional access operations performed by an embodiment when demultiplexing and descrambling a service; and FIG. 16 is an overview of a system for providing conditional access data.

SYSTEM OVERVIEW

Figure 1:
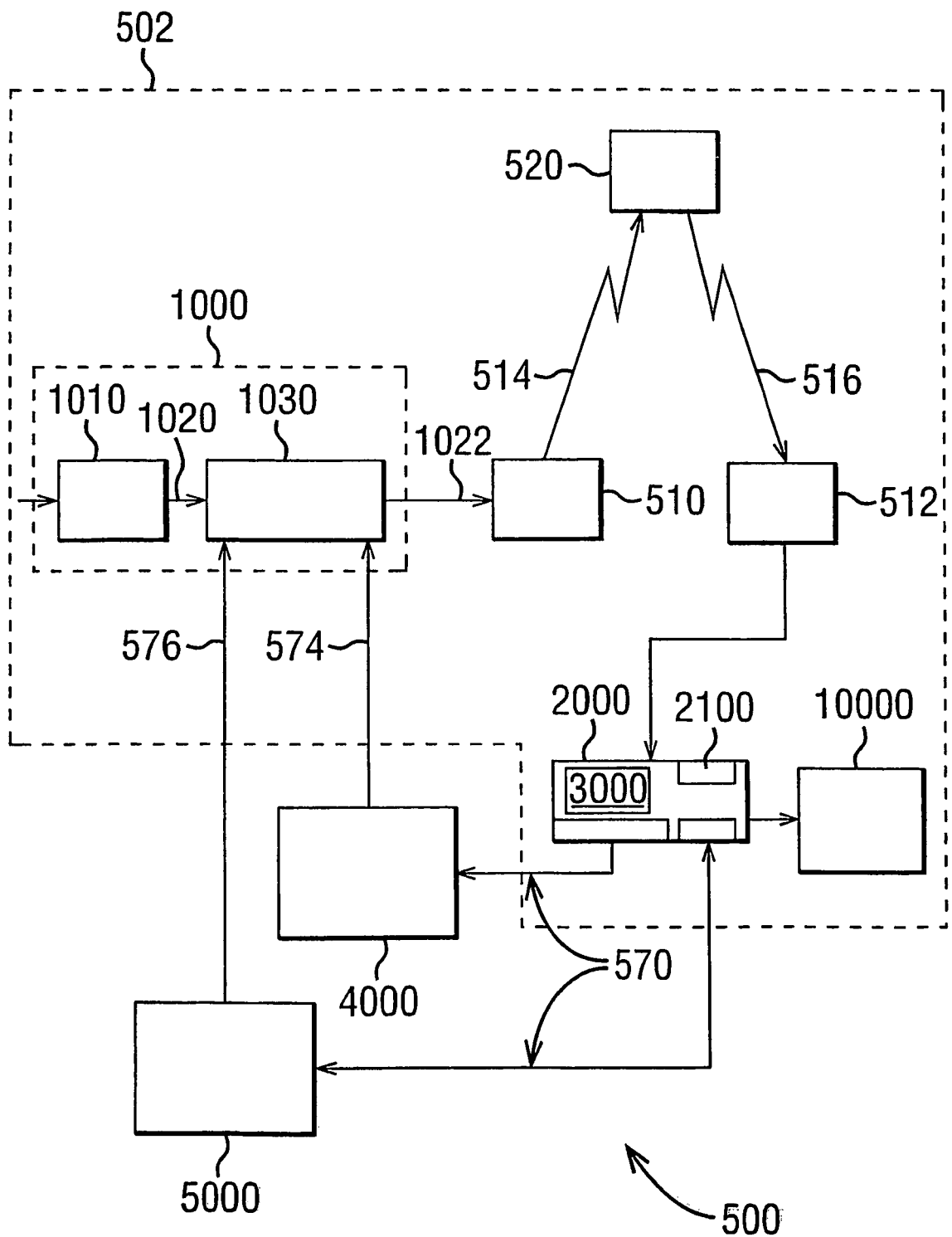
FIG. 1 is an overview of a satellite digital television system.

An overview of a digital television system 500 is shown in FIG. 1. As will be discussed below, the system 500 comprises a broadcast centre 1000, a receiver/decoder 2000, a software/hardware architecture 3000 of the receiver/decoder, an interactive system 4000, and a conditional access system 5000, as will all be discussed below.

The system 500 includes a mostly conventional digital television system 502 that uses the known MPEG-2 compression system to transmit compressed digital signals. In more detail, MPEG-2 compressor 1010 in a broadcast centre 1000 receives a digital signal stream (typically a stream of video signals). The compressor 1010 is connected by linkage 1020 to a multiplexer and scrambler 1030.

The multiplexer 1030 receives a plurality of further input signals, assembles the transport stream and transmits compressed digital signals to a transmitter 510 of the broadcast centre via linkage 1022, which can of course take a wide variety of forms including telecommunications links. The transmitter 510 transmits electromagnetic signals via uplink 514 towards a satellite transponder 520, where they are electronically processed and broadcast via notional downlink 516 to earth receiver 512, conventionally in the form of a dish owned or rented by the end user. Other transport channels for transmission of the data are of course possible, such as terrestrial broadcast, cable transmission, combined satellite/cable links, telephone networks etc.

The signals received by receiver 512 are transmitted to an integrated receiver/decoder 2000 owned or rented by the end user and connected to the end user's television set 10000. The receiver/decoder 2000 decodes the compressed MPEG-2 signal into a television signal for the television set 10000. Although a separate receiver/decoder is shown in FIG. 1, the receiver/decoder may also be part of an integrated digital television. As used herein, the term "receiver/decoder" includes a separate receiver/decoder, such as a set-top box, and a television having a receiver/decoder integrated therewith.

In the receiver/decoder 2000 a hard disk 2100 is provided, on which audiovisual and other data can be stored. This allows advanced recording and playback facilities for programmes received by the receiver/decoder, and also allows large amounts of other types of data, such as electronic programme guide data, to be stored in the receiver/decoder.

A content management and protection system (CMPS) 2300 (not shown) in the receiver/decoder provides the ability securely and flexibly to control the recording and playback of data on the hard disk 2100 (or other storage device).

In a multichannel system, the multiplexer 1030 handles audio and video information received from a number of parallel sources and interacts with the transmitter 510 to broadcast the information along a corresponding number of channels. In addition to audiovisual information, messages or applications or any other sort of digital data may be introduced in some or all of these channels interlaced with the transmitted digital audio and video information.

An interactive system 4000 is connected to the multiplexer 1030 and the receiver/decoder 2000, and is located partly in the broadcast centre and partly in the receiver/decoder. It enables the end user to interact with various applications via a back channel 570. The back channel may be, for example a Public Switched Telephone Network (PSTN) channel (for example, a modemmed back channel) or an Out of Band (OOB) channel.

A conditional access system 5000, also connected to the multiplexer 1030 and the receiver/decoder 2000 and again located partly in the broadcast centre and partly in the receiver/decoder, enables the end user to access digital television broadcasts from one or more broadcast suppliers. A smartcard, capable of deciphering messages relating to commercial offers (that is, one or several television programmes sold by the broadcast supplier), can be inserted into the receiver/decoder 2000. Using the receiver/decoder 2000 and smartcard, the end user may purchase commercial offers in either a subscription mode or a pay-per-view mode. Typically this is achieved using the back channel 570 which is used by the interactive system 4000.

As mentioned above, programmes transmitted by the system are scrambled at the multiplexer 1030, the conditions and encryption keys applied to a given transmission being determined by the access control system 5000. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the receiver/decoder 2000 having access to an equivalent to the exploitation key stored on a smartcard inserted in the receiver/decoder to decrypt the encrypted control word and thereafter descramble the transmitted data. A paid-up subscriber will receive, for example, in a broadcast monthly EMM (Entitlement Management Message) the exploitation key necessary to decrypt the encrypted control word so as to permit viewing of the transmission.

Figure 2:
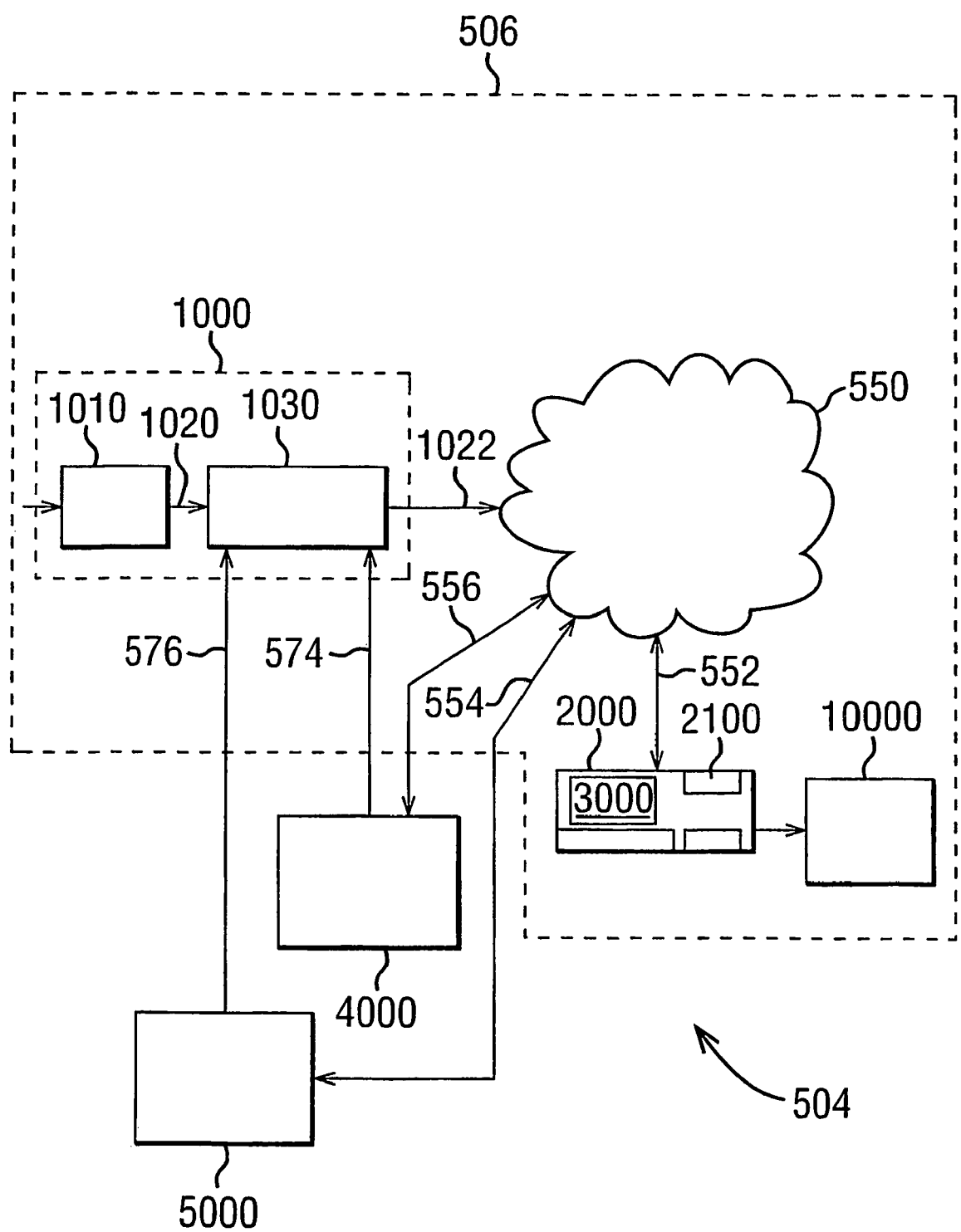
FIG. 2 is an overview of a cable digital television system.

FIG. 2 illustrates an alternative embodiment of a digital television system 504, utilising a cable network as the broadcast medium for the compressed digital signals. In this figure, like parts are indicated with like numerals.

The satellite transponder and transmitting and receiving stations are replaced by a cable network 550. Additionally, in this particular embodiment, the modemmed back channel between the receiver/decoder 2000 and the interactive system 4000 and conditional access system 5000 is removed, replaced by linkages 554, 556 between the cable network 550 and the conditional access system 5000 and interactive system 4000 respectively. The receiver/decoder 2000 thus communicates with the other systems via the cable network 550, utilising a cable modem or other means to allow it to send and receive data via the same link as it receives data from the broadcast centre.

The cable network 550 may be any form of wide area network (WAN), such as a dedicated connection, the internet, local cable distribution network, wireless connection, or any combination of the above. In the present embodiment, the hybrid fibre coax (HFC) network is used. It is appreciated that the various means of communication between the receiver/decoder 2000 and the other components of the television system are interchangeable.

Conditional Access System

Figure 3:
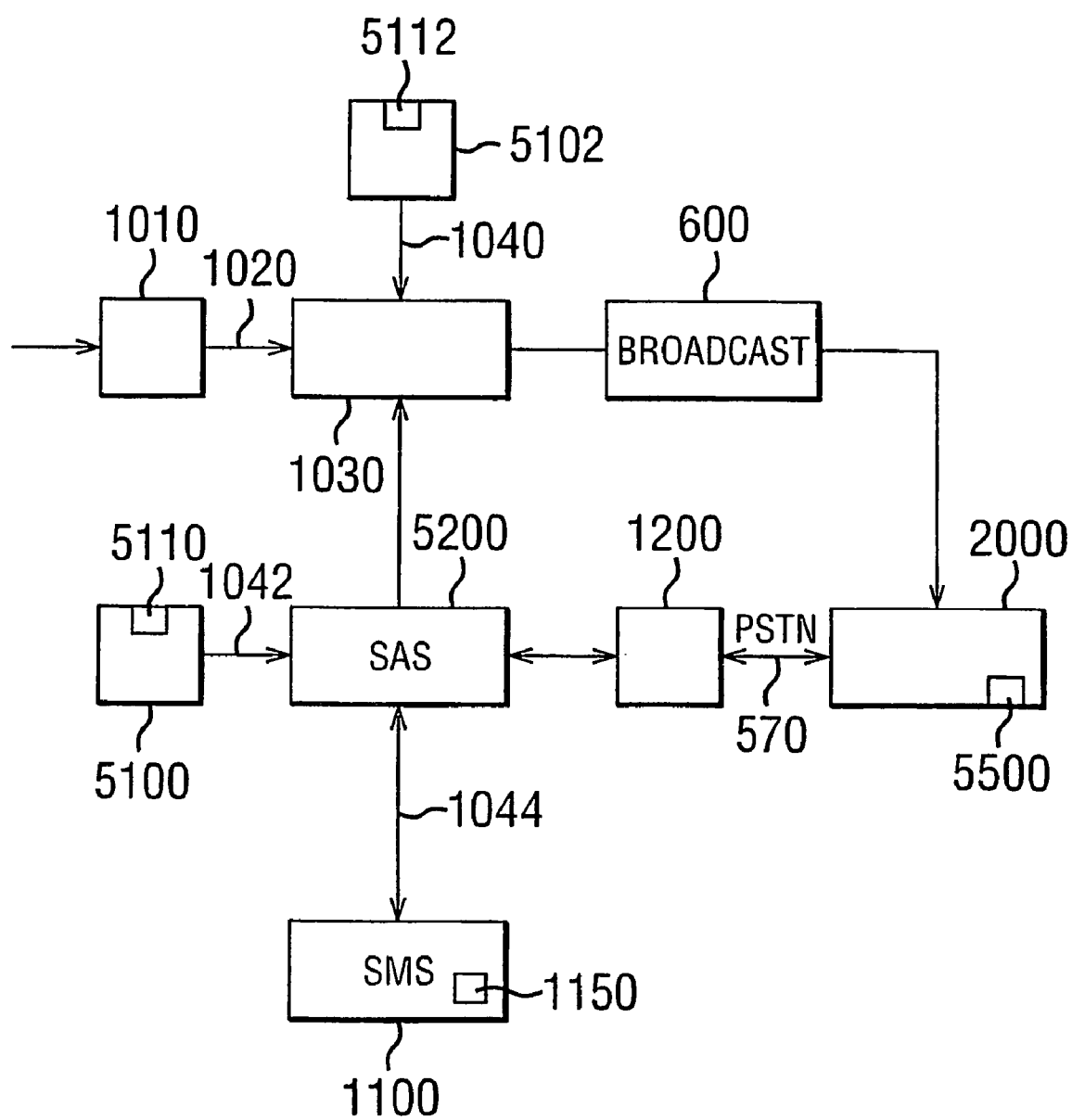
FIG. 3 is an overall system view, with the head-end shown in more detail.

With reference to FIG. 3, in overview the conditional access system 5000 includes a Subscriber Authorization System (SAS) 5200. The SAS 5200 is connected to one or more Subscriber Management Systems (SMS) 1100, one SMS for each broadcast supplier, by a link 1044, which may be a TCP-IP link or other type of link. Alternatively, one SMS could be shared between two commercial operators, or one operator could use two SMSs, and so on.

First encrypting units in the form of ciphering units 5100 utilising "mother" smartcards 5110 are connected to the SAS by linkage 1042. Second encrypting units again in the form of ciphering units 5102 utilising mother smartcards 5112 are connected to the multiplexer 1030 by linkage 1040. The receiver/decoder 2000 receives a "daughter" smartcard 5500. The receiver/decoder is connected directly to the SAS 5200 via communications servers 1200 and the modemmed back channel 570. The SAS sends amongst other things subscription rights to the daughter smartcard on request.

In variants of the preferred embodiment, internet or cable connections either complement or replace the PSTN 570 and communications servers 1200.

The smartcards contain confidential information from one or more commercial operators. The "mother" smartcard encrypts different kinds of messages and the "daughter" smartcards decrypt the messages, if they have the rights to do so.

With reference to FIG. 3, in the broadcast centre, the digital video signal is first compressed (or bit rate reduced), using the MPEG-2 compressor 1010. This compressed signal is then transmitted to the multiplexer and scrambler 1030 in order to be multiplexed with other data, such as other compressed data.

The scrambler generates a control word used in the scrambling process and included in the MPEG-2 stream in the multiplexer 1030. The control word is generated internally and enables the end user's integrated receiver/decoder 2000 to descramble the programme.

Access criteria, indicating how the programme is commercialised, are also added to the MPEG-2 stream. The programme may be commercialised in either one of a number of "subscription" modes and/or one of a number of "Pay Per View" (PPV) modes or events. In the subscription mode, the end user subscribes to one or more commercial offers, or "bouquets", thus getting the rights to watch every channel inside those bouquets. In the Pay Per View mode, the end user is provided with the capability to purchase events as he wishes.

Both the control word and the access criteria are used to build an Entitlement Control Message (ECM); this is a message sent in relation with one scrambled program; the message contains a control word (which allows for the descrambling of the program) and the access criteria of the broadcast program. The access criteria and control word are transmitted to the second encrypting unit 5102 via the linkage 1040. In this unit, an ECM is generated, encrypted and transmitted on to the multiplexer and scrambler 1030.

Each service broadcast by a broadcast supplier in a data stream comprises a number of distinct components; for example a television programme includes a video component, an audio component, a sub-title component and so on. Each of these components of a service is individually scrambled and encrypted for subsequent broadcast. In respect of each scrambled component of the service, a separate ECM is required.

The multiplexer 1030 receives electrical signals comprising encrypted EMMs from the SAS 5200, encrypted ECMs from the second encrypting unit 5102 and compressed programmes from the compressor 1010. The multiplexer 1030 scrambles the programmes and transmits the scrambled programmes, the encrypted EMMs and the encrypted ECMs as electric signals to broadcast system 600, which may be for example a satellite system as shown in FIG. 1, or other broadcast system. The receiver/decoder 2000 demultiplexes the signals to obtain scrambled programmes with encrypted EMMs and encrypted ECMs.

The receiver/decoder receives the broadcast signal and extracts the MPEG-2 data stream. If a programme is scrambled, the receiver/decoder 2000 extracts the corresponding ECM from the MPEG-2 stream and passes the ECM to the "daughter" smartcard 5500 of the end user. This slots into a housing in the receiver/decoder 2000. The daughter smartcard 5500 controls whether the end user has the right to decrypt the ECM and to access the programme. If not, a negative status is passed to the receiver/decoder 2000 to indicate that the programme cannot be descrambled. If the end user does have the rights, the ECM is decrypted and the control word extracted. The decoder 2000 can then descramble the programme using this control word. The MPEG-2 stream is decompressed and translated into a video signal for onward transmission to television set 10000.

If the programme is not scrambled, no ECM will have been transmitted with the is MPEG-2 stream and the receiver/decoder 2000 decompresses the data and transforms the signal into a video signal for transmission to television set 10000.

The subscriber management system (SMS) 1100 includes a database 1150 which manages, amongst others, all of the end user files, commercial offers (such as tariffs and promotions), subscriptions, PPV details, and data regarding end user consumption and authorization. The SMS may be physically remote from the SAS.

The SMS 1100 transmits messages to the SAS 5200 which imply modifications to or creations of Entitlement Management Messages (EMMs) to be transmitted to end users. The SMS 1100 also transmits messages to the SAS 5200 which imply no modifications or creations of EMMs but imply only a change in an end user's state (relating to the authorization granted to the end user when ordering products or to the amount that the end user will be charged). The SAS 5200 also sends messages (typically requesting information such as call-back information or billing information) to the SMS 1100, so that it will be apparent that communication between the two is two-way.

Receiver/Decoder

Figure 4:
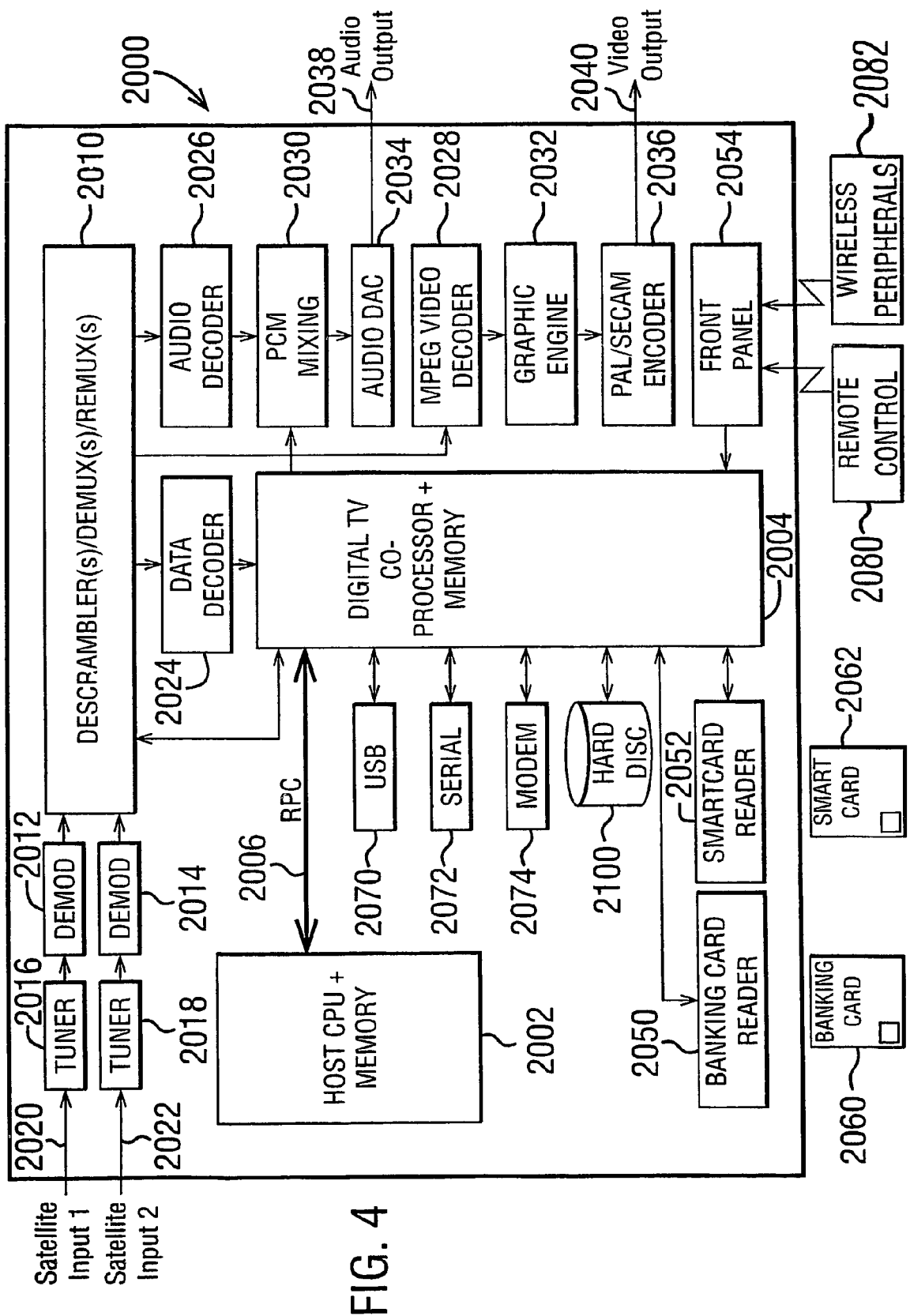
FIG. 4 is a schematic of the component architecture of the receiver/decoder.

Referring to FIG. 4, the various elements of receiver/decoder 2000 will now be described in terms of functional blocks.

The receiver/decoder 2000, which may be, for example, a digital set-top box (DSTB), comprises a central host processor 2002 and a digital TV coprocessor 2004, both having associated memory elements (not shown) and joined by a coprocessor bus 2006. The coprocessor 2004 is adapted to receive input data from a USB interface 2070, a serial interface 2072, a parallel interface (not shown), a modem 2074 (connected to the modem back channel 570 of FIG. 1), and switch contacts on the front panel 2054 of the decoder.

The receiver/decoder is additionally adapted to receive inputs from an infra-red remote control 2080 (and optionally from other wireless peripherals 2082 such as Bluetooth-enabled devices) and also possesses two smartcard readers 2050, 2052 adapted to read bank and subscription smartcards 2060, 2062 respectively. The subscription smartcard reader 2052 engages with an inserted subscription card 2062 and with a conditional access unit (not shown) to supply the necessary control word to a demultiplexer/descrambler/remultiplexer unit 2010 to enable the encrypted broadcast signal to be descrambled. The decoder also includes a conventional tuner 2016 and demodulator 2012 to receive and demodulate the satellite transmission before being filtered and demultiplexed by the demodulator/descrambler unit 2010. A second tuner 2018 and second demodulator 2014 are also provided, to allow, amongst other things, a second channel to be received and decoded in parallel with the first.

A hard disk 2100 is also provided, allowing storage of programme and application data received and generated by the receiver/decoder. In conjunction with the two tuners 2016, 2018, two demodulators 2012, 2014, the descrambler/demultiplexer/remultiplexer 2010, and the data decoder 2024 and audio decoder 2026, advanced recording and playback features are provided, allowing simultaneous recordings of one or more programmes while a further programme is being viewed, and more general transfers to and from the hard disk to and from the display devices and/or inputs and outputs, all occurring in parallel.

The audio output 2038 and video output 2040 in the receiver/decoder are fed by the PCM mixer 2030 and audio DAC 2034, and the MPEG video decoder 2028, graphic engine 2032 and PAL/SECAM encoder 2036 respectively. Alternative or complementary outputs may of course be provided.

As used in this description, an application is preferably a piece of computer code for controlling high level functions of preferably the receiver/decoder 2000. For example, when the end user positions the focus of remote control 2080 on a button object seen on the screen of the television set (not shown) and presses a validation key, the instruction sequence associated with the button is run. Applications and the associated middleware are executed by the host processor 2002, with remote procedure calls (RPCs) being made to the digital TV coprocessor 2004 across the coprocessor bus 2006 as and when required.

An interactive application proposes menus and executes commands at the request of the end user and provides data related to the purpose of the application. Applications may be either resident applications, that is, stored in the ROM (or FLASH or other non-volatile memory) of the receiver/decoder 2000, or broadcast and downloaded into the RAM, FLASH memory or hard disk of the receiver/decoder 2000.

Applications are stored in memory locations in the receiver/decoder 2000 and represented as resource files. The resource files comprise graphic object description unit files, variables block unit files, instruction sequence files, application files and data files.

The receiver/decoder contains memory (not shown) divided into at least one RAM volume, a FLASH volume and at least one ROM volume, but this physical organization is distinct from the logical organization. The memory may further be divided into memory volumes associated with the various interfaces. From one point of view, the memory can be regarded as part of the hardware; from another point of view, the memory can be regarded as supporting or containing the whole of the system shown apart from the hardware.

Architecture of Receiver/Decoder

Figure 5:
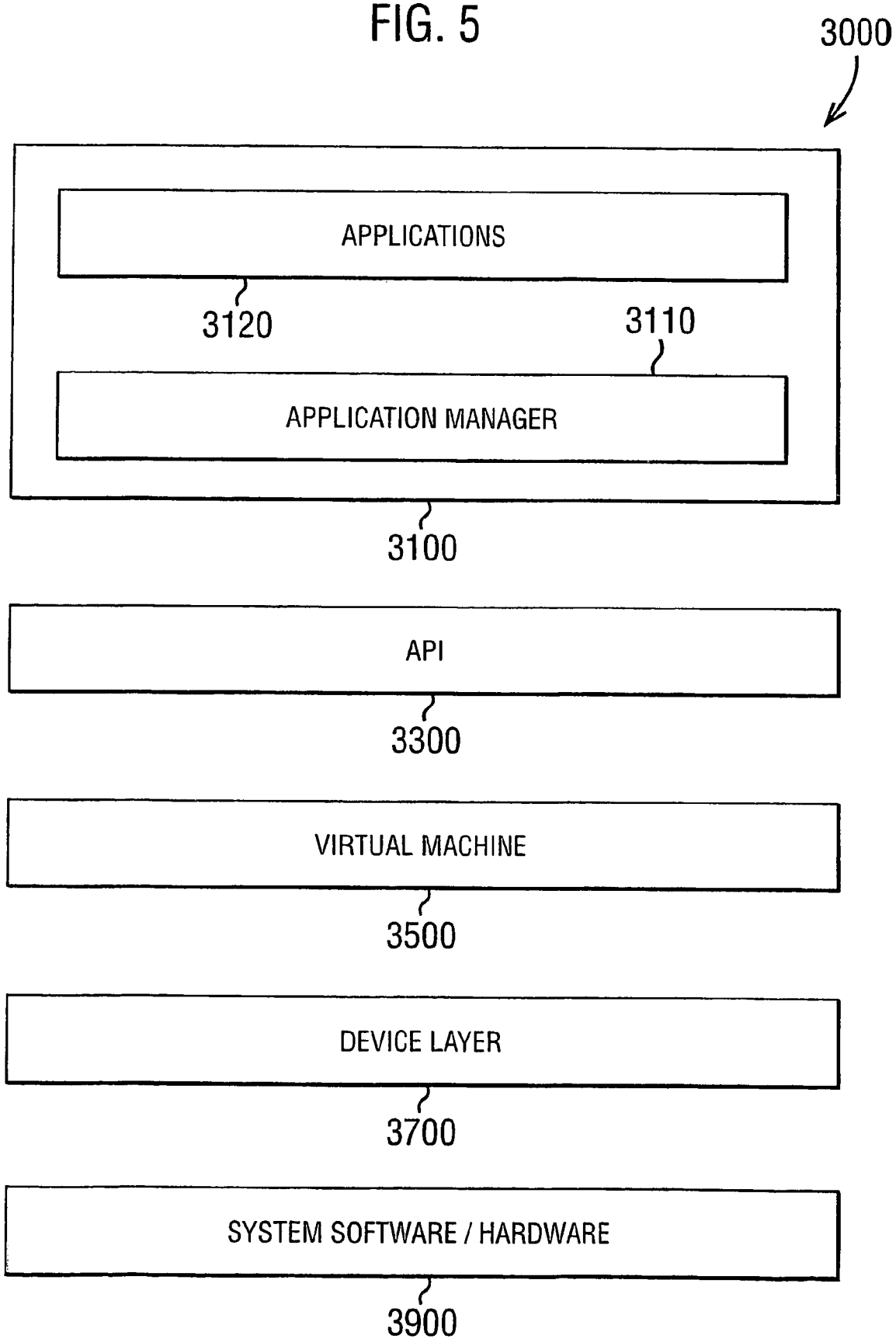
FIG. 5 is a diagram of the software architecture of the receiver/decoder.

With reference to FIG. 5, the software/hardware architecture 3000 of the receiver/decoder contains five software layers, organized so that the software can be implemented in any receiver/decoder and with any operating system. The various software layers are application layer 3100, application programming interface (API) layer 3300, virtual machine layer 3500, device layer interface 3700 (often abbreviated just to 'device layer') and system software/hardware layer 3900.

The application layer 3100 encompasses applications 3120 that are either resident in or downloaded to the receiver/decoder. They may be interactive applications used by customers, written in, for example, Java, HTML, MHEG-5 or other languages, or they may be applications used by the receiver/decoder for other purposes, for example for running such interactive applications. This layer is based on a set of open Application Programming Interfaces (APIs) provided by the Virtual Machine layer. This system allows applications to be downloaded to the hard disk, flash memory or RAM memory in the receiver/decoder on-the-fly or on demand. The application code can be transmitted in compressed or uncompressed format using protocols such as Data Storage Media Command and Control (DSMCC), Network File Server (NFS) or other protocols.

The API layer 3300 provides high-level utilities for interactive application development. It includes several packages that make up this high-level API. The packages provide all the functionality necessary to run interactive applications. The packages are accessible by the applications.

In a preferred embodiment the API is adapted for applications written in the Java, PanTalk or such similar programming languages. Furthermore, it can facilitate the interpretation of HTML and other formats, such as MHEG-5. Besides these features, it also includes other packages and service modules that are detachable and extensible as requirements dictate.

The virtual machine layer 3500 is composed of language interpreters and various modules and systems. This layer, managed by a kernel 3650 (not shown), consists of everything necessary to receive and execute interactive applications in the receiver/decoder.

The device layer interface 3700 includes a Device Manager and software devices (generally referred to herein as just 'devices'). Devices are software modules which consist of the logical resources necessary for management of external events and physical interfaces. The device layer interface, under the control of the Device Manager, manages communication channels between drivers and applications and provides enhanced error exception checking. Some examples of managed (hardware) devices are: card readers 3722 (not shown), modems 3730 (not shown), network 3732. (not shown), PCMCIA (Personal Computer Memory Card International Association), LED display and so on. Programmers do not have to deal with this layer directly, since the API layer controls the devices from above.

The system software/hardware layer 3900 is provided by the manufacturer of the receiver/decoder. Because of the modularity of the system and because services supplied by the higher-level operating system (such as event scheduling and memory management) are part of the virtual machine and kernel, the higher layers are not tied to a particular Teal-time operating system (RTOS) or to a particular processor.

Typically the virtual machine layer 3500, occasionally in combination with the device layer interface 3700 and/or API 3300, is referred to as the 'middleware' of the receiver/decoder.

Figure 6:
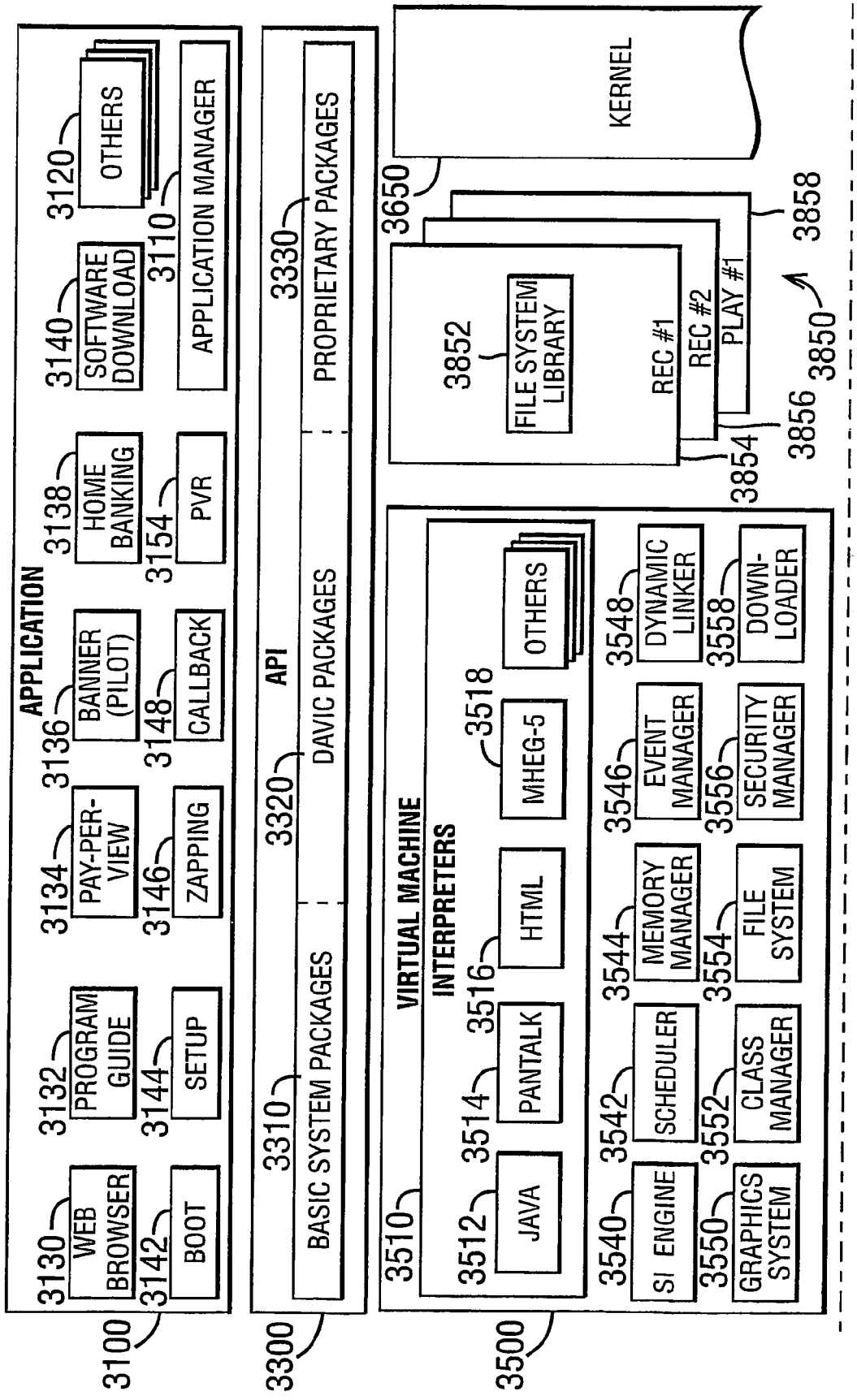
FIG. 6 is a diagram showing the top half of FIG. 5 in more detail.

With reference to FIG. 6 the software architecture of the receiver/decoder 3000 corresponding to the top half of FIG. 5 (comprising the application layer 3100, API layer 3300 and virtual machine layer 3500) will now be described in more detail.

Interactive applications are applications that the user interacts with, for example, to obtain products and services, such as electronic program guides, telebanking applications and games.

There are two types of application in the application layer 3100, plus the Application Manager 3110. There are interactive applications such as a Web Browser 3130 which can be added at any time as long as they conform to the API 3300, and there are resident applications which manage and support the interactive applications. The resident applications are substantially permanent and include the following:

Boot. The Boot application 3142 is the first application launched when the receiver/decoder is powered on. The Boot application first starts the Application Manager 3110, and then starts the "Manager" software modules in the virtual machine 3500, such as the Memory Manager 3544 and the Event Manager 3546.

Application Manager. The Application Manager 3110 manages the interactive applications that are run in the receiver/decoder, that is, it starts, stops, suspends, resumes, handles events and deals with communication between applications. It allows multiple applications to run at once, and thus is involved in the allocation of resources among them. This application is completely transparent to the user.

SetUp. The purpose of the SetUp application 3144 is to configure the receiver/decoder, primarily the first time it is used. It performs actions such as scanning for TV channels, setting the date and time, establishing user preferences, and so on. However, the SetUp application can be used at any time by the user to change the receiver/decoder configuration.

Zapping. The Zapping application 3146 is used to change channels using the Program-up, Program-down and numeric keys. When another form of zapping is used, for example, through a banner (pilot) application, the Zapping application is stopped.

Callback. The Callback application 3148 is used to extract the values of various parameters stored in the receiver/decoder memory and return these values to the commercial operator via modemmed back channel 1070 (not shown), or by other means.

Other applications in the application layer 3100 include a program guide application 3132, a pay-per-view application 3134, a banner (pilot) application 3136, a home banking application 3138, a software download application 3140 and a PVR (personal video recorder) application 3154 (see below).

As noted above, the Application Programming Interface (API) layer 3300 contains several packages. These include basic system packages 3310, used, for example, to access basic features of the virtual machine, DAVIC packages 3320, and proprietary packages 3330, used to access features of the software architecture unique to the principal software vendor.

Considered in more detail, the virtual machine 3500 includes the following:

Language Interpreters 3510. Different interpreters can be installed to conform to the type of applications to be read. These, include Java interpreters 3512, PanTalk interpreters 3514, HTML interpreters 3516, MHEG-5 interpreters 3518 and others.

Service Information (SI) Engine. The SI Engine 3540 loads and monitors common Digital Video Broadcasting (DVB) or Program System Information Protocol (PSIP) tables and puts them into a cache. It allows access to these tables by applications which need the data contained in them.

Scheduler 3542. This module allows for pre-emptive, multithreaded scheduling with each thread having its own event queue.

Memory Manager 3544. This module manages the access to memory. It also automatically compresses data in memory when necessary and performs automatic garbage collection.

Event Manager 3546. This module allows events to be triggered according to priority. It manages timer and event grabbing and allows applications to send events to each other.

Dynamic Linker 3548. This module allows the resolution of addresses arising from native Java functions, loads native methods from a Java class downloaded into RAM and resolves calls from downloaded native codes towards ROM.

Graphics System 3550. This system is object-orientated and optimized. It includes graphic window and object management as well as a vectorial font engine with multi-language support.

Class Manager 3552. This module loads classes and resolves any class referencing problems.

File System 3554. This module is compact and optimized to manage a hierarchical file system with multiple ROM, flash, RAM and DSMCC volumes. Flash integrity is guaranteed against any incidents.

Security Manager 3556. This module authenticates applications and controls the access of applications to sensitive memory and other zones of the set-top box.

Downloader 3558. This module uses automatic data loading from a remote DSMCC carousel or through the NFS protocol, with downloaded files accessed in the same way as resident ones. Memory-clear-up, compression and authentication are also provided.

Furthermore, the DAVIC resource notification model is supported so that client resources are efficiently managed.

A kernel 3650 manages the various different processes running in the virtual machine 3500 and device layer interface 3700 (not shown). For efficiency and reliability reasons, the kernel implements relevant parts of the POSIX standard for operating systems.

Under control of the kernel, the virtual machine (running Java and Pantalk applications) runs in its own thread, separate to other 'server' elements of the operating system, such as the mass storage server 3850 (not shown). Corresponding provisions, such as requiring Thread IDs to be passed as parameters in system calls, are also made in the API layer 3300 to allow the applications 3120 to benefit from the multithreaded environment.

By providing multiple threads, more stability can be achieved. For example, if the virtual machine 3500 ceases to operate for some reason, by suffering a crash or being blocked for a long time by an application trying to access a device, other time-critical parts of the system, such as the hard disk server, can continue to operate.

As well as the virtual machine 3500 and kernel 3650, a hard disk video recorder (HDVR) module 3850 is provided for handling the recording and playback functions of the hard disk 2210 or other attached mass storage component. The server comprises two separate threads 3854, 3856 handling recording, one thread 3858 for handling playback, and a file system library 3852 for interfacing with the mass storage components.

An appropriate one of the threads 3854, 3856, 3858 in the hard disk video recorder (HDVR) 3850 receives commands (such as a command to start recording a particular programme) from clients such as the personal video recorder (PVR) application 3154, in response to the user pressing a 'record' button, for example.

In turn, the thread in question then interacts with the service device 3736 (shown in FIG. 7) to set up and synchronise the parts of the receiver/decoder handling the bitstream to be recorded or played back. In parallel, the thread also interacts with the file system library 3852 to coordinate the recording or playback operation at appropriate places on the hard disk 2210 (not shown).

The file system library 3852 then sends commands to the mass storage device 3728 (also shown in FIG. 7) which tell the mass storage device 3728 which sub-transport stream (STS) to transfer (via a FIFO buffer), and on which hard disk target the stream should be stored. Allocation of clusters on the hard disk and general file management is carried out by the file system library 3852, the mass storage device itself being concerned with lower level operations.

The service device 3736 mentioned above is unique amongst the devices in that it does not relate to a physical component of the receiver/decoder. It instead provides a high level interface which groups together in a single 'instance' the various sets of tuner, demultiplexer, remultiplexer and hard disk devices in the receiver/decoder, freeing higher level processes from the difficulties of coordinating the various sub-devices.

Figure 7:
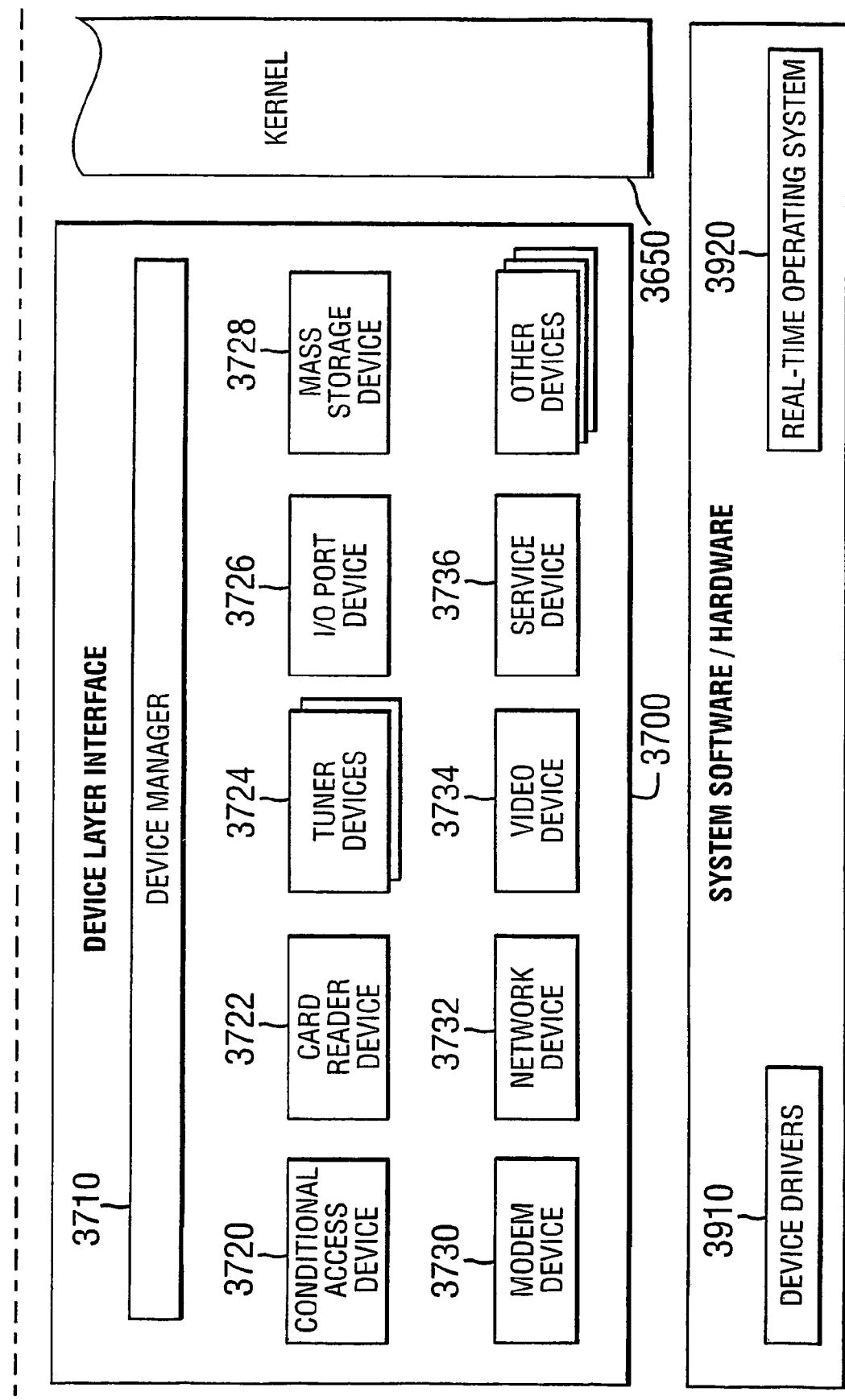
FIG. 7 is a diagram showing the bottom half of FIG. 5 in more detail.

With reference to FIG. 7 the software architecture of the receiver/decoder 3000 corresponding to the bottom half of FIG. 5 (comprising the device layer interface 3700 and the system software and hardware layer 3900) will now be described in more detail.

Further devices provided in the device layer include the conditional access device 3720, tuner devices 3724 corresponding to the two (or potentially more) tuners 2016, 2018 of FIG. 4, the video device 3734, the I/O port device 3726, and the service device 3736 and mass storage device 3728 mentioned above.

In broad terms, a device can be regarded as defining a logical interface, so that two different devices may be coupled to a common physical port. Certain devices may communicate among themselves, and all devices also operate under the control of the kernel 3650.

Before using the services of any device, a program (such as an application instruction sequence) has to be declared as a "client", that is, a logical access-way to the device or the device manager 3710. The manager gives the client a client number which is referred to in all accesses to the device. A device can have several clients, the number of clients for each device being specified depending on the type of device. A client is introduced to the device by a procedure "Device: Open Channel". This procedure assigns a client number to the client. A client can be taken out of the device manager 3710 client list by a procedure "Device: Close Channel".

The access to devices provided by the device manager 3710 can be either synchronous or asynchronous. For synchronous access, a procedure "Device: Call" is used. This is a means of accessing data which is immediately available or a functionality which does not involve waiting for the desired response. For asynchronous access, a procedure "Device: I/O" is used. This is a means of accessing data which involves waiting for a response, for example scanning tuner frequencies to find a multiplex or getting back a table from the MPEG stream. When the requested result is available, an event is put in the queue of the engine to signal its arrival. A further procedure "Device: Event" provides a means of managing unexpected events.

Figure 8:
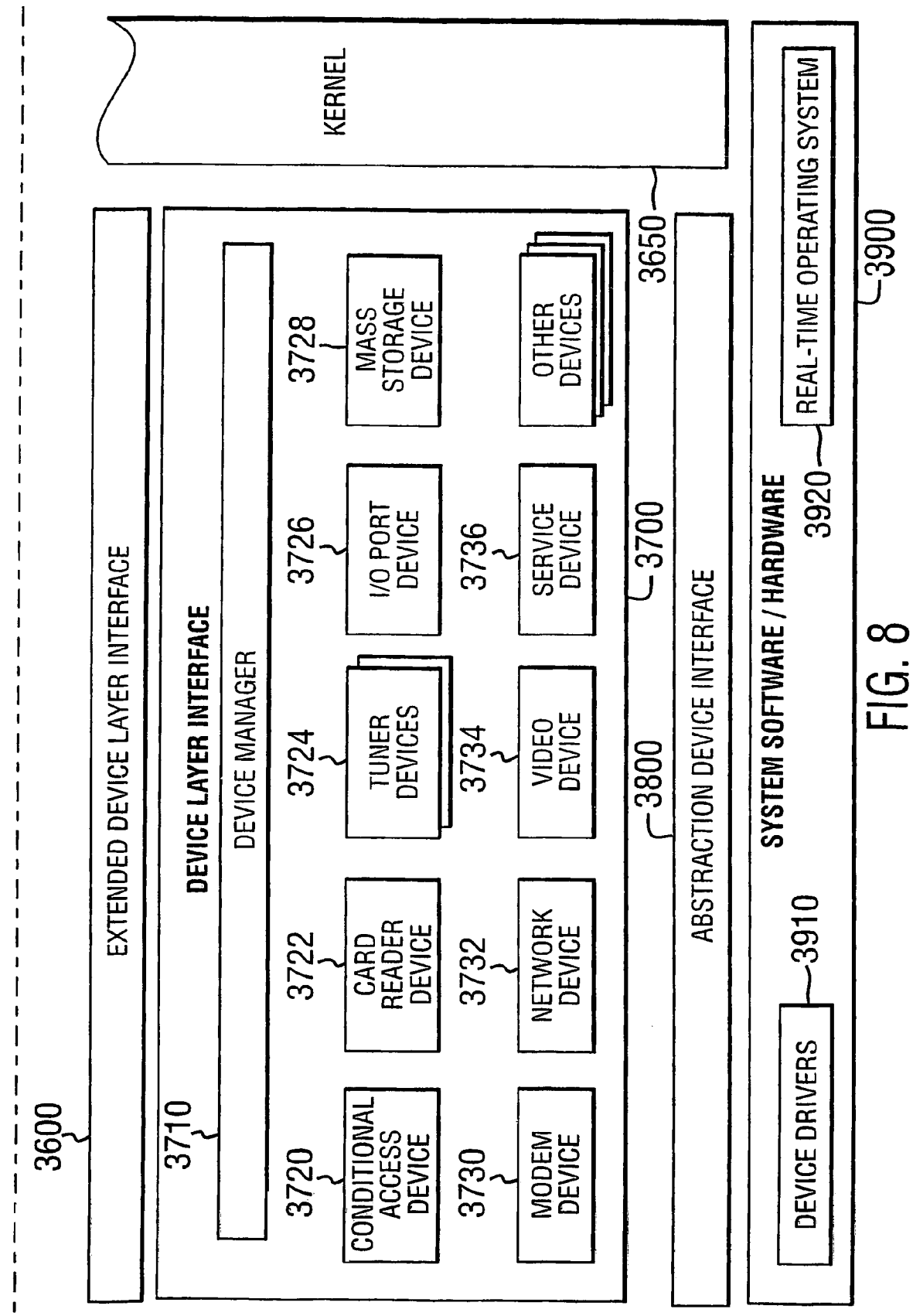
FIG. 8 is a diagram showing an alternative embodiment of the bottom half of FIG. 5.

In a second embodiment of the receiver/decoder, the lower half of the architecture of the receiver/decoder is replaced by the layers shown in FIG. 8.

In this embodiment, an extended device layer interface (EDLI) 3600 is provided between the virtual machine 3500 (not shown) and the device layer interface 3700, and an abstraction device interface 3800 is provided between the device layer interface 3700 and the system software/hardware layer 3900. Otherwise, like parts are indicated with like reference numerals.

The extended device layer interface (EDLI) 3600 provides a dedicated interface between the virtual machine 3500 and the device layer interface 3700 and generally provides multithreading support to the device layer interface. Functions of the EDLI include routing asynchronous events to the appropriate thread in the middleware (since the device layer interface need not itself support multithreading) and routing messages between threads.

The abstraction device interface 3800 provides a further interface between the device layer interface 3700 and the device drivers 3910 in the system software/hardware layer 3900. By providing such an interface, the large and complex device layer 3700 can be made hardware independent to a greater degree.

Further Aspects of System Devices

The organisation of software devices within the receiver/decoder 2000, and in particular the use of device instantiation and logical demultiplexers to provide enhanced functionality, are described in more detail below. A logical demultiplexer, which advantageously makes use of the above-mentioned features of device instantiation, is then described.

Subsequently, the use of the above-mentioned logical demultiplexer for demultiplexing more than one service simultaneously (to allow one demultiplexer to perform the role of two conventional demultiplexers, for example) and for recording more than one service (such as a digital television programme) simultaneously are then described. The provision of a control word device and other system aspects for use in managing conditional access will then be described, and finally there follows description of the use of two tuners, particularly with respect to conditional access data and having a close relationship with the above-mentioned logical demultiplexer.

Device Instantiation in the Context of Device Management

In the preferred embodiment, the device manager 3710 is adapted to instantiate the devices required by the receiver/decoder. This instantiation of software devices and their detailed structure is now described in more detail, with reference to FIG. 9.

Figure 9:
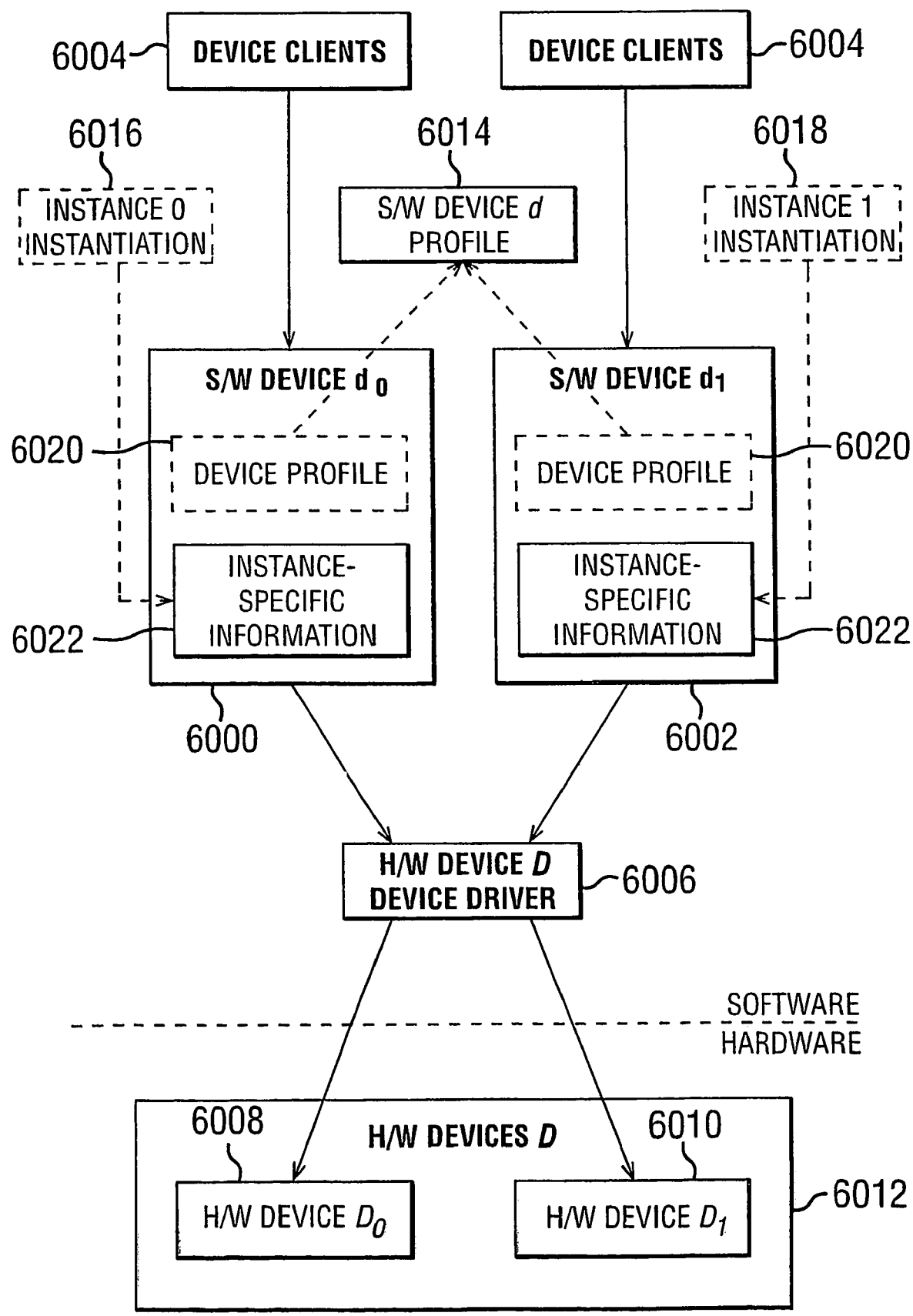
FIG. 9 shows the structure of software devices in accordance with an embodiment.

FIG. 9 shows two software devices $d_0$ 6000 and $d_1$ 6002, their respective clients 6004, a device driver 6006 for the corresponding hardware device class D, and the corresponding hardware devices $D_0$ 6008 and $D_1$ 6010, which form part of the same class 6012 of devices (of type D). Also shown is the (software) device profile d 6014, and the instantiation data 6016, 6018 for each respective device 6000, 6002. As will be described in more detail below, the devices 6000, 6002 themselves comprise a portion 6020 corresponding to the device profile, and a portion 6022 corresponding to instance-specific information. It should be noted that the principles discussed below in relation to FIG. 9 apply also to any number of software and hardware devices other than the two shown.

The devices 6000, 6002 form part of the device layer 3700; the device clients typically form part of the application layer 3100, API layer 3300, virtual machine layer 3500 or device layer 3700; and the device driver 6006 and hardware devices 6008, 6010 form part of the system software/hardware layer 3900, all as shown in FIGS. 6, 8 and 9.

In order to create greater flexibility and efficiency, each of the 'software devices' referred to elsewhere is created by a process of instantiation. In more detail, when the receiver/decoder 2000 is initialised or reinitialised, the device manager 3710 instantiates in turn each of the software devices—such as devices $d_0$ 6000 and $d_1$ 6002—by combining a general 'device profile' for each required device—such as the device profile d 6014—with instance-specific information (which may be no more than the instance identifier)—such as instantiation information 6016 or 6018.

In the preferred embodiment, the device profile comprises a stand-alone version of the corresponding instantiated device, including the necessary interfaces, code and data fields, options (for example including the commands to be supported) being specified for each device instance. After instantiation (for example, by byte-for-byte code duplication of the device profile), every instance of a particular device is then entirely independent from other instances of the same or other devices.

It should also be noted that in FIG. 9 a generic device driver 6006 is provided for accessing the hardware functions of the devices D; in this case, calls to this device driver (as opposed to higher level calls to the device manager 3710) specify the particular one of the hardware devices to which the call relates (by supplying the device instance number as a parameter, for example). Depending on the implementation of the device layer 3700 and system software/hardware layer 3900, which can vary widely, separate device drivers might instead be provided for each of the hardware devices 6008, 6010.

Figure 10:
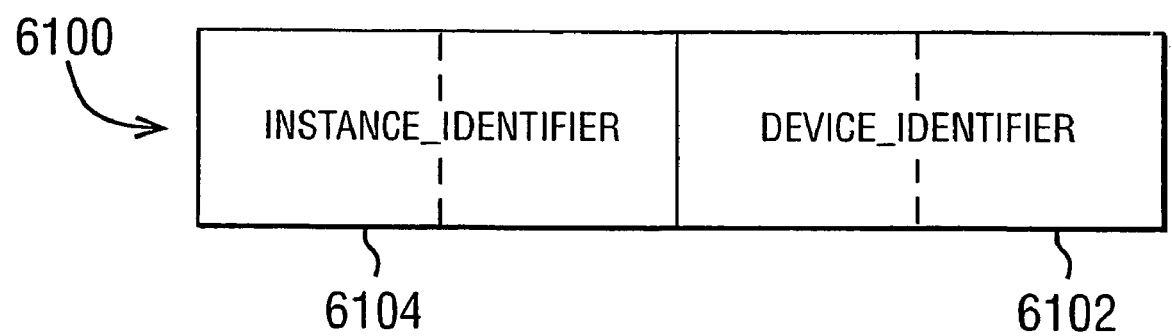
FIG. 10 shows the structure of a compound device identifier.

Each class or type of device is allocated a two-byte class identifier 6102 which identifies that class of device uniquely. Upon instantiation, each device of a particular class is allocated a two-byte instance identifier 6104 which is unique within that class. That is to say the first TUNER device may be allocated the same instance identifier as the first DEMUX device (described below), however, no two TUNER devices will have the same instance identifier. After instantiation, each device is uniquely identified by a compound, four-byte identifier 6100 (see FIG. 10) constructed from the class identifier 6102 (forming the lowest two bytes of the compound identifier) and the instance identifier 6104 (forming the highest two bytes of the identifier).

In more detail, the devices D could be the tuners in the receiver/decoder, for example, which, in broad terms, are adapted to select for decoding a number of different transport streams broadcast on different frequencies.

In this case, the hardware devices $D_0$ and $D_1$ would be the two tuners 2016, 2018 shown in FIG. 4 respectively, the software devices $d_0$ 6000 and $d_1$ 6002 would be the two TUNER devices 3724 shown in FIGS. 7 and 8, and the hardware device driver would be a tuner device driver (not shown elsewhere), which would allow direct communication with the hardware underlying the two tuners (although as noted above, separate device drivers could be provided for each tuner).

To illustrate the above, a typical function provided by the generic TUNER device (a is the TUNER_TUNING_SET command, for example, which sets various properties of the given tuner, including frequency, signal polarisation, and so on. The TUNER_TUNING_SET command is used, for example, by the zapping application 3146 mentioned earlier in order to change channels. In this system, the actual executable code corresponding to the TUNER_TUNING_SET command is common to all TUNER devices, but allows each TUNER device to be tuned independently of the others. Information such as the current frequency of a particular tuner instance (such as $d_0$) is contained in the instance-specific information for the particular TUNER device ($d_0$).

The device profile 6014 and the instantiation data 6016, 6018 will now be further described with reference to FIGS. 11a and 11b.

In contrast to the situation shown in FIG. 9, where there are a plurality of hardware devices and corresponding software devices (such as the two tuners and the corresponding TUNER software devices mentioned above), there may be only one software device in a given device class (such as for the LCARD smartcard reader device, for example). In this case, a device profile is still provided, from which a single instance is created, as described above.

The stored operating system comprises the device profiles necessary to create all of the required software device instances. As described above, in the preferred embodiment, when the operating system is booted or rebooted (following a power-on or other reset of the receiver/decoder). Thus, the instantiation of software devices is static, performed once every reset. Since the hardware provided in the receiver/decoder is also static, this is generally perfectly acceptable.

In some cases, as will be described in more detail later, a particular functionality offered by a subset of a hardware device or a group of hardware devices is encapsulated in a single software device, providing a 'logical' software device without a physical equivalent. An example of this would be the logical demultiplexer, which is described later.

The communication of devices with one another and with applications under the control of the device manager 3710 is now described in more detail.

Each device communicates with an application, or potentially another device, under the control of the device manager 3710. The device manager 3710 controls access to the devices, declares receipt of an unexpected event and manages shared memory. The three procedures used by the devices for communication with one another and with other parts of the system (for example, applications) are introduced above. In greater detail, these three procedures serve the following purposes:

"Device: Call" procedures are used to give synchronous commands or effect data transfer. Execution of an application requesting this procedure is suspended during execution of the command or the data transfer. This allows operations which must be performed in strict sequence to be controlled reliably.

"Device: I/O" procedures provide for asynchronous operation. That is, an application can send a request for a data transfer or a particular function to be performed by a device, and execution of the requesting application continues while the data transfer or function is performed. When a requested result is available, an event is put in a queue by the device manager 3710 to signal its arrival.

"Device: Event" procedures provide a means of managing unexpected events, enabling events to be signalled to an application by a device. When a device makes such a call, the device manager 3710 loads an event item into a queue. The Event Manager 3546 of the virtual machine 3500 extracts event items according to a priority level allocated to each event item and inserts them into appropriate further queue structures specific to particular applications in the virtual machine 3500. When an application receives an event, it is interrupted and responds independently of the code it was executing at the time an event is signalled. Events may be used to notify something which has occurred on an interface, such as a bus reset, or can be used to notify a result in response to an asynchronous command for instance to signal completion of a requested data transfer.

If a particular function of a class of software device is not supported by the underlying hardware (that is to say that, if a device feature, such as a scan feature for a tuner device for example, is not provided in hardware), instances of that software device will not provide that function.

As indicated earlier, an important feature is the abstraction of functionality from its supporting physical device(s). Each function can potentially be a complex one, involving several physical devices, and a set of functions may be related in that they involve an overlapping set of physical or logical devices. This is dealt with by device instantiation as described generally above. One device class can be instantiated with respect to more than one function. This is exemplified by the description of multiple demultiplexing functions in a receiver/decoder below, each demultiplexing function having its own set of device instances and the device instances belonging to overlapping sets of device classes.

Logical Devices

As indicated above, the preferred embodiment comprises logical devices. A logical device is one which may, but does not necessarily, correspond to a single item of underlying hardware. The functionality provided by a logical device may for example be a subset of the functionality provided by an item of hardware or it may be an amalgamation of functionality provided by a number of items of hardware. It may include functionality provided by the software device itself without the support of an item or items of hardware. Furthermore, a logical device may provide functionality which it accesses by making calls to one or more further software devices, which may provide that functionality with or without the support of an item or items of hardware.

The preferred embodiment provides demultiplexing functionality to applications using logical demultiplexer (DEMUX) devices, which make calls both to hardware and to other software devices.

A set of software devices is provided in the device layer interface 3700 for accessing demultiplexing functions of the DDR unit 2010 in response to a request by an application. This set comprises:

a DEMUX device (3762 in FIG. 11) for extracting packets from a transport stream and for coordinating the activities of the other devices;

an MLOAD device 3738 for extracting data sections from packets of a transport stream, an MCOM device 3764 for transfer of data sections from an transport stream to a communication port, including the filtering and manipulation of that data, a CA device 3720 for overseeing conditional access operations, a CW device 3760 (further described below) for passing control words to descramblers, a TS_REMUX device 3766 for assembling a transport stream, and a SERVICE device 3736 for overseeing the presentation of a service to a viewer.

In the preferred embodiment, three types of logical demultiplexer device are provided (see FIG. 11):

PLAYER 6220, which is able to play a service (including the extraction of packets from a transport stream, descrambling those packets and routing them to the correct part of the system for display), RECORDER 6230, which is able to record a service (including the extraction of packets from a transport stream, the construction of a programme stream and the routing of that stream to the correct part of the system for recording), and PLAYER/RECORDER 6240, which is capable of performing the actions of both of the above types of demultiplexer device.

Figure 11:
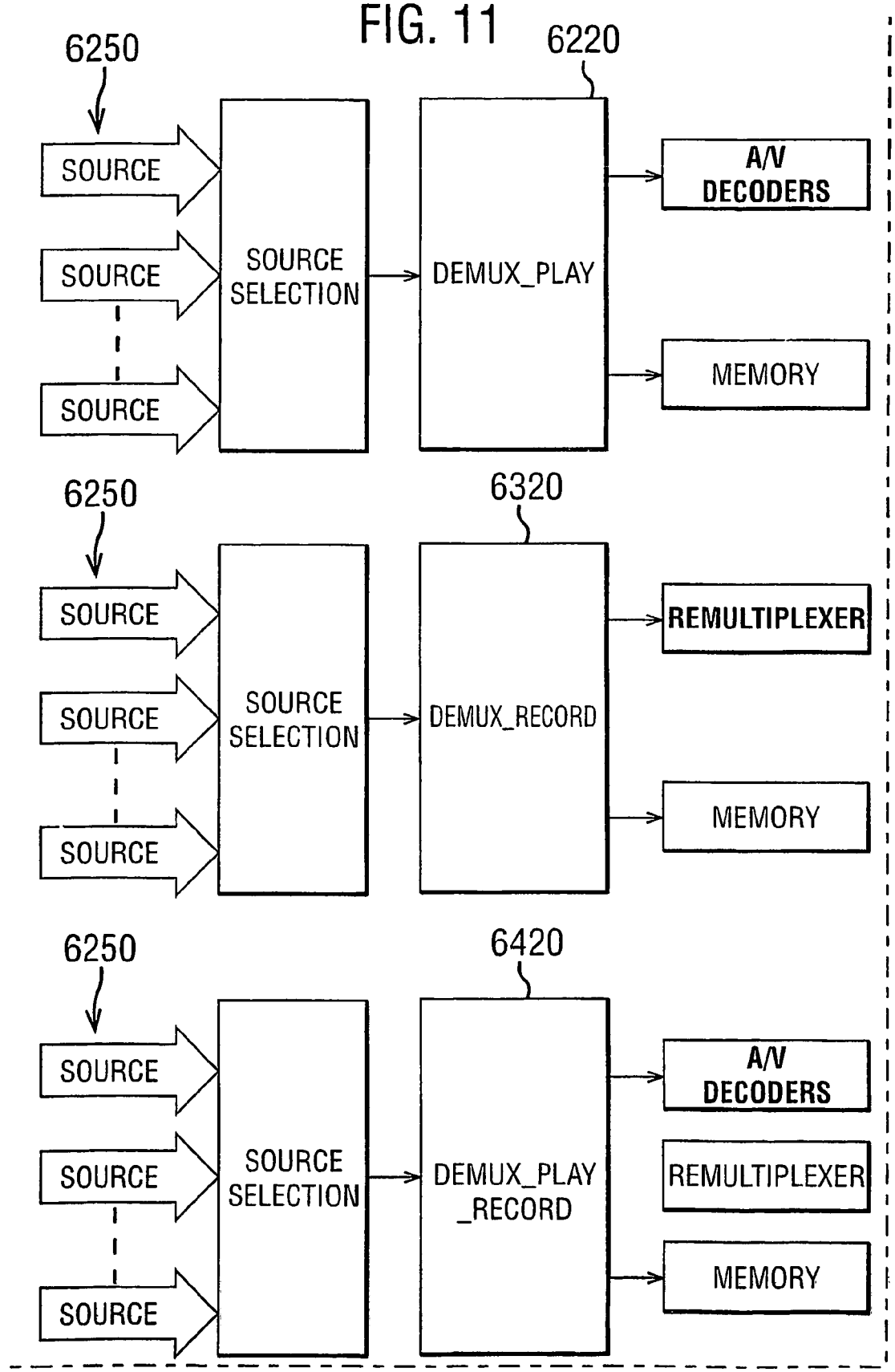
FIG. 11 shows the three types of logical demultiplexer and their supporting devices in accordance with an embodiment.

These three types of logical demultiplexer are supported by different subsets 6222, 6232, 6242 of the software devices listed above, as can be seen in FIG. 11. The PLAYER logical demultiplexer 6220 does not require a TS_REMUX device 3766 since it does not need to construct a programme transport stream, and the RECORDER logical demultiplexer 6232 does not require a SERVICE device 3736 since it is not concerned with the presentation of a service to a, viewer. For each logical demultiplexer a dedicated one of each of the required other software devices listed above is also instantiated.

When a logical demultiplexer requires functionality provided by a hardware demultiplexer, for example to record a service from an incoming transport stream, the logical demultiplexer first notifies the hardware demultiplexer of the source of the transport stream using a DEMUX_SET_SOURCE command. The possible sources include one of the tuners (further information regarding the provision of multiple tuners is provided below), the hard disk via a buffer (for example, a FIFO), and a port to which an external device is attached. If the demultiplexer is active in demultiplexing a stream from a different source, it notifies the logical demultiplexer device that it is not available to perform the requested operation. Otherwise the source of the demultiplexer is set to the indicated source and the requested operation is performed. The procedure for allocating a hardware demultiplexer to perform a desired demultiplexing operation is further described below.

In a particularly preferred embodiment, the logical devices comprise one or more identifier identifying one or more physical or other software devices which implement the functionality offered by the logical device. In a further preferred embodiment, a database containing data indicating which logical devices uses which other device(s) is maintained, for example by the device manager.

Multiple Demultiplexers/Remultiplexers

In a preferred embodiment, the DDR 2010 comprises two (or, in a particularly preferred embodiment, three) physical demultiplexers, each capable of being set to demultiplex up to 32 PIDs received from a distinct source. Moreover, preferred embodiments are able, for example using the logical demultiplexer devices described above, to use each physical demultiplexer to demultiplex more than one service from a particular source simultaneously.

In order illustrate this feature, the procedure for the selection of a physical demultiplexer to perform a desired demultiplexing operation will now be described, with reference to FIGS. 12a, b and c, and 13, in the context of a receiver/decoder having two physical demultiplexers 6302, 6304.

FIGS. 12a and b show first and second tuners 2016 and 2018 and (schematically) first and second demultiplexers 6302 and 6304. In FIG. 12a, the first demultiplexer 6302 is active in demultiplexing a service being received in a transport stream X 6310 to which the first tuner 2016 is tuned; the first tuner 2016 is therefore set as the source 6250 of the first demultiplexer. The following describes the procedure undertaken when, under these circumstances, it is desired to demultiplex a service comprising 5 PIDs from a second transport stream Y 6320.

A logical demultiplexer device (as described above) is allocated to oversee the demultiplexing operation. The logical demultiplexer then performs the following procedure, described with reference to FIG. 13.

The logical demultiplexer device determines (at step 7002) whether any physical demultiplexer is demultiplexing a service from the desired transport stream. If so, then it checks (at step 7004) whether that physical demultiplexer has sufficient capacity to demultiplex five additional PIDs. If the answer is yes again, the logical demultiplexer uses that physical demultiplexer to perform the desired operation.

In the case of this example, however, no physical demultiplexer has the correct source for the desired operation (that is, a tuner tuned to transport stream Y). Therefore, after step 7002, the logical demultiplexer checks (at step 7006) whether any physical demultiplexer is inactive by determining whether any has its source disconnected. If no physical demultiplexers are inactive, then the logical demultiplexer returns an error (at step 7008) to the application which requested the demultiplexing operation. However, in the case of this example, the source of the second physical demultiplexer is disconnected, and it is therefore available to be used by the logical demultiplexer, which switches the source of the second physical demultiplexer to the second tuner 2018, and requests that the second tuner be tuned to the frequency of the desired transport stream (in the preferred embodiment, by sending a command to a TUNER device 3724 as described above).

In a second example, commencing with the situation shown in FIG. 12a, it is desired to demultiplex five additional PIDs from transport stream X 6310. In this case, at step 7002, it is discovered that the first physical demultiplexer 6302 does have the desired source. The logical demultiplexer then determines (at step 7004) whether the first physical demultiplexer 6302 has sufficient capacity to demultiplex five additional PIDs; it does since it is presently demultiplexing only five PIDs (as stated above, each demultiplexer may simultaneously demultiplex 32 PIDs from a transport stream). The logical demultiplexer therefore uses the first physical demultiplexer 6302 to perform the desired operation, switching its source to the first tuner 2016, as shown in FIG. 12c.

The preferred embodiment also comprises two (or more) physical remultiplexers, each capable of constructing, in a known manner, a transport stream for storage from the demultiplexed packets of a service The embodiment is thus capable of presenting more than one service simultaneously (for example, in a picture-in-picture configuration) or recording more than one service simultaneously (upon which subject more information is provided below), or recording one or more services while presenting one or more different services, regardless of whether the services being presented/recorded are being received on the same or different transport streams.

Recording Multiple Services

As indicated above, the preferred embodiment is capable of recording more than one service simultaneously.

The requirement to do so may arise, for example, when a viewer decides to record a first programme and a second programme being broadcast at overlapping times. Alternatively, a viewer may wish to record a first programme and time shift a second programme being broadcast at the same time as the first. This latter case will now be described in the context of a preferred embodiment, with reference to FIG. 14.

For the purposes of this discussion, it is presumed that the user wishes to watch (and timeshift) programme A being received in transport stream X, having duration 90 minutes and commencing at 21 h 00; and to record programme B being received in transport stream Y, having duration 45 minutes and commencing at 21 h 30.

Having indicated earlier in a known manner that programme B is to be recorded, the user indicates at 21 h 00 that he desires to watch programme A, for example by selecting programme A from an electronic programme guide. A PLAYER/RECORDER logical demultiplexer device, DEMUX_PLAY_RECORD 6240 (as described above), is allocated to the demultiplexing of the service forming programme A; DEMUX_PLAY_RECORD determines, using the process described above, that the first physical demultiplexer, HW_DEMUX_0 6302, is available to demultiplexer from a tuner. A first tuner, TUNER_0 2016, is tuned to the frequency of transport stream X, and the source of HW_DEMUX_0 6302 is set to TUNER_0 2016 using the DEMUX_SET_SOURCE command. The PIDs of the elementary streams belonging to programme A are obtained from the SI Engine 3540 (described above) and passed to HW_DEMUX_0 6302 which commences demultiplexing of those PIDs. The extracted elementary stream packets are descrambled (as described below) and presented to the user in a known manner.

At 21 h 30, a RECORDER logical demultiplexer device, DEMUX_RECORD 6220, is allocated to the demultiplexing of the service forming programme B. The DEMUX_RECORD 6220 determines, as described above, that HW_DEMUX_0 6302 is performing a demultiplexing operation on the transport stream being received in transport stream X, but that a second physical demultiplexer, HW_DEMUX_1 6304, is available. A second tuner, TUNER_1 2016, is tuned to the frequency of transport stream Y, and the source of HW_DEMUX_1 6304 is set to TUNER_1 2016.

The PIDs belonging to programme B are determined as above and passed to HW_DEMUX_1 6304 which commences demultiplexing of those PIDs. The extracted elementary streams are then remultiplexed and stored on the hard disk in a known manner.

For the purposes of this discussion we now suppose that, at 21 h 45, the user decides that he wishes to postpone viewing of the remaining 45 minutes of programme A, and indicates this by pressing a PAUSE button on a remote control. DEMUX_PLAY_RECORD 6240 ceases the descrambling of the extracted elementary streams, causes the SERVICE device 3736 allocated to it to freeze the video display on screen and commences the remultiplexing of the elementary streams using the TS_REMUX device 3766 allocated to it. The remultiplexed stream is stored on the hard disk in a known manner.

At 22 h 00, the user indicates that he wishes to view the remaining 45 minutes of programme A by pressing a resume button on a remote control. A PLAYER logical demultiplexer, DEMUX_PLAY 6220, is allocated to the demultiplexing of the stored portion of programme A; DEMUX_PLAY 6220 determines that HW_DEMUX_0 6302 and HW_DEMUX_1 6304 are not available to demultiplex a stream from the hard disk, and a third physical demultiplexer, HW_DEMUX_2 (not shown), is selected and its source set to the hard disk (via a FIFO) in a known manner. The stored portion of programme A is read, demultiplexed and descrambled from the hard disk by DEMUX_PLAY until 22 h 45, while DEMUX_PLAY_RECORD continues to demultiplex and remultiplex programme A from TUNER_0 2016 until 22 h 30. DEMUX_RECORD 6230 ceases demultiplexing and remultiplexing programme B from TUNER_1 2018 at 22 h 15.

If the user decides subsequently to view programme B, DEMUX_PLAY 6220 performs the demultiplexing operations, and so on, as described above.

Control Word Device

In known systems, the control words are extracted from the ECMs by the conditional access smartcard housed in the card reader. In embodiments of the invention, the control words continue to be extracted from the ECMs by the smartcard, but further processing of the conditional access data is handled at a higher level in the architecture.

Preferred embodiments comprise a further software device, the control word (CW) device 3760, for managing descrambling operations performed by the descrambler in the DDR 2010.

As mentioned above, the Service Information (SI) Engine 3540 loads and monitors common Digital Video Broadcasting (DVB) or Program System Information Protocol (PSIP) tables and puts them into a cache. Data contained in the tables includes Conditional Access Tables (CATs) from which the PIDs for Entitlement Control Messages (ECMs), each containing an encrypted control word and access criteria for a programme component, can be ascertained. To descramble incoming programme components, the relevant control words need to be loaded to the conditional access smartcard (CA smartcard) 2062 where they can be decrypted, using the key received in an Entitlement Management Message (EMM), and then used in the DDR unit 2010 for descrambling.

The handling of ECMs will now be further described with reference to FIG. 15.

When a service is to be descrambled, a CA kernel 6402 in the middleware (for example, forming part of the virtual machine) receives an event from elsewhere in the system (for example, from the Zapping application 3146) identifying the channel upon which the service to be descrambled is being received. The CA kernel 6402 retrieves from the data cached by the SI engine 3540 the PIDs of the ECMs relevant to the service to be descrambled and instructs the MLOAD device 3738 in the DLI to isolate the ECMs 6420 as they are received in the programme data stream. The isolated ECMs are then routed by the CA kernel 6402 to the conditional access smartcard 2062 which operates under the control of an LCARD device 3740. The conditional access smartcard extracts control words from the ECMs in a known manner, if it has the rights to do so, and the extracted code words are passed by the CA kernel 6402 to the Control Word (CW) device 3760 in the DLI. As a result, the handling of the control words is not visible at a the DLI level, resulting in increased security.

As indicated above, the role of the CW device is to manage descrambling operations performed by the physical descrambler(s). In the preferred embodiment, the CW device is instantiated, as described above, and each instance of the device is a client of the (or one of the) descrambler(s). The CW device allocates a descrambler channel, identified by a descrambler channel identifier DESCR_ID, to each requested descrambling operation for which different access conditions apply (that is, requiring the use of different control words).

For a particular descrambling operation, the CW device is responsible for the following tasks:
receiving a request indicating that data is to be descrambled;
allocating a descrambler channel to the descrambling operation;
selecting the type of descrambling operation to be performed (for example, DVB CS, DES and Triple DES);
passing the control keys to the descrambler;
flushing control keys from a descrambler channel, when necessary; and
closing a channel when it is no longer required.

In addition, the CW device determines the maximum number of descrambler channels which can be allocated at any time, based on the capabilities of the descramblers, and it notifies the CA kernel if a request for a descrambling operation cannot be accommodated.

Multiple Tuners

The provision of two or more tuners in preferred embodiments will be described below after a brief review of provisions for conditional access in prior art systems.

In known systems, an MPEG transport stream carries a limited number of audio and video programmes, the number being dependent on factors such as the degree of data compression, and so on. Administrative data, including conditional access data, for all of the programmes being broadcast from a head-end is inserted into each of the transport streams, so that a receiver/decoder is able to determine for which programmes the rights to view are held, without tuning to each transport stream in turn. This provision of such data in each transport stream reduces the bandwidth available for content itself, and thus increases the number of transport streams, transponders, and so on, necessary for the distribution of a bouquet.

In a preferred embodiment, a head-end is provided which is capable of broadcasting this administrative data (including conditional access data) in a single transport stream only. It is indicated above that a preferred embodiment comprises two tuners. In a preferred embodiment, one of these tuners (or, in a particularly preferred embodiment, an additional tuner) is dedicated to the task of receiving this administrative data.

In the description above referring to FIGS. 1, 2 and 3, a single multiplexer 1030 is described for constructing a transport stream for broadcast to users over a linkage 1022. The multiplexer 1030 in fact represents a plurality of multiplexers which construct the plurality of transport streams necessary for broadcasting a bouquet. The provision of an additional multiplexer for broadcasting administrative data in a preferred embodiment is now further described with reference to FIG. 16.

In addition to the multiplexers 1030, an administrative data multiplexer 1030' is provided which receives the encrypted EMMs from the SAS 5200, encrypted ECMs from the second encrypting unit 5102, datastream description tables (for example, the PATs and the PMTs), update packets for the CAT table and any other data of a similar type, which it uses to assemble an administrative data transport stream. This transport stream has a broadcast route 600' (which may be the same as the broadcast routes 600). In this embodiment, the administrative data is not inserted into the transport streams constructed by the multiplexers 1030.

When a receiver/decoder is installed at a user's premises, the frequency of the administrative data transport stream is programmed during initialisation. In an alternative embodiment, the receiver/decoder is adapted to scan frequencies for a transport stream identifying itself as the administrative data transport stream.

In further embodiments, the conditional access data is not broadcast (and therefore received) on a dedicated channel, but on a channel which also carries some programme data. In yet further embodiments, channel-hopping is implemented, such that channel upon which the conditional access data is broadcast changes.

In a preferred embodiment of a receiver/decoder intended to be used to receive transport streams broadcast by a headend as described above, there is provided a first tuner 2016 tunable to the administrative data transport stream and a second tuner 2018 (or, in a particularly preferred embodiment, second and third tuners) tunable to transport streams comprising programme data.

It will be readily understood that, in, order to demultiplex both programme data and administrative data simultaneously, the preferred embodiment of receiver/decoder must be provided with at least two physical demultiplexers in the DDR unit 2010, a first to filter programme stream PIDs from one transport stream and a second to filter the related administrative data PIDs from the administrative data transport stream. In fact, as indicated above, a particularly preferred embodiment comprises three physical demultiplexers.

The precise details of the implementation of the various functions described above, and their distribution between hardware and software, are a matter of choice for the implementer and will not be described in detail. It is, however, noted that dedicated integrated circuits capable of performing the operations required in the receiver/decoder are commercially available or can be readily designed, and these can be used as the basis for a hardware accelerator, or more preferably modified to produce a dedicated hardware accelerator, to implement various of the operations required, thereby reducing the processing power required to run the software. However, the operations required may be implemented in software if sufficient processing power is available.

The modules and other components have been described in terms of the features and functions provided by each component, together with optional and preferable features. With the information given and specifications provided, actual implementation of these features and the precise details are left to the implementer. As an example, certain modules could be implemented in software, preferably written in the C programming language and preferably compiled to run on the processor used to run the application; however, some components may be run on a separate processor, and some or all components may be implemented by dedicated hardware.

The above modules and components are merely illustrative, and the invention may be implemented in a variety of ways, and, in particular, some components may be combined with others which perform similar functions, or some may be omitted in simplified implementations. Hardware and software implementations of each of the functions may be freely mixed, both between components and within a single component.

It will be readily understood that the functions performed by the hardware, the computer software, and such like are performed on or using electrical and like signals. Software implementations may be stored in ROM, or may be patched in FLASH.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. An apparatus for controlling a demultiplexing process in a decoder integral with a receiver, comprising:
    a control signal management unit for managing signals for controlling a demultiplexing device to demultiplex at least a first and a second data stream over a common time period;
    wherein said control signal management unit maintains a first family of devices for use in controlling the demultiplexing device for demultiplex the first data stream, and a second family of devices for use in controlling the demultiplexing device to demultiplex the second data stream, and
    wherein the first and second family of devices are each allocated an identifier comprising at least one common portion for a corresponding family of devices, wherein the common portion for the first family of devices is different from the common portion for the second family of devices, wherein the identifiers are used to coordinate processes executed by each family of devices to control the demultiplexing device to demultiplex a respective data stream.

2. The apparatus of claim 1, further comprising at least one remultiplexing device for remultiplexing each of the first and second data streams.

3. The apparatus of claim 1, wherein the apparatus is for use in the decoder integral with a receiver, and wherein the decoder integral with a receiver comprises at least a first and a second input for connection to respective channels, and a correlation unit for correlating a signal received at the first input with a signal received at the second input.

4. A method of controlling a demultiplexing process in a decoder integral with a receiver, comprising:
    sending at least one control signal to a demultiplexing device, wherein the at least one control signal identifies a first data stream and a second data stream to be demultiplexed over a common time period;
    maintaining a first family of devices for use in controlling the demultiplexing device to demultiplex the first data stream;
    maintaining a second family of devices for use in controlling the demultiplexing device to demultiplex the second data stream; and
    allocating an identifier to each device in each family of devices, wherein the identifiers comprise at least one common portion associated with a corresponding family of devices, wherein the common portion for the first family of devices is different from the common portion for the second family of devices, wherein the identifiers are used to coordinate processes executed by each family of devices to control the demultiplexing device to demultiplex a respective data stream.

* * * * *